US010971291B2

(12) United States Patent
Hull et al.

(10) Patent No.: US 10,971,291 B2
(45) Date of Patent: Apr. 6, 2021

(54) SYSTEM AND METHOD FOR OPERATING A BULK SUPERCONDUCTOR DEVICE

(71) Applicant: THE BOEING COMPANY, Chicago, IL (US)

(72) Inventors: John R. Hull, Sammamish, WA (US); Michael Strasik, Sammamish, WA (US); Daniel Elliott Sievers, Owens Cross, AL (US)

(73) Assignee: THE BOEING COMPANY, Chicago, IL (US)

( * ) Notice: Subject to any disclaimer, the term of this patent is extended or adjusted under 35 U.S.C. 154(b) by 182 days.

(21) Appl. No.: 15/639,814

(22) Filed: Jun. 30, 2017

(65) Prior Publication Data

US 2019/0006072 A1 Jan. 3, 2019

(51) Int. Cl.
*H01F 6/00* (2006.01)
*H01F 6/06* (2006.01)
*H02J 15/00* (2006.01)
*B64D 41/00* (2006.01)
*H01F 6/04* (2006.01)
*B64G 1/42* (2006.01)

(52) U.S. Cl.
CPC ............ *H01F 6/06* (2013.01); *B64D 41/00* (2013.01); *H01F 6/00* (2013.01); *H01F 6/003* (2013.01); *H02J 15/00* (2013.01); *B64D 2041/005* (2013.01); *B64G 1/425* (2013.01); *H01F 6/04* (2013.01)

(58) Field of Classification Search
CPC .... H01F 6/00; H01F 6/003–6/008; H01F 6/04
See application file for complete search history.

(56) References Cited

U.S. PATENT DOCUMENTS

| | | | |
|---|---|---|---|
| 3,253,193 A * | 5/1966 | Lubell | H01F 6/00 335/216 |
| 3,518,496 A | 6/1970 | Schweitzer | |
| 4,078,747 A * | 3/1978 | Minovitch | B64G 1/425 136/292 |
| 5,289,150 A * | 2/1994 | Rabinowitz | H01F 6/008 310/52 |
| 5,545,932 A | 8/1996 | Estop et al. | |
| 6,083,886 A | 7/2000 | Hayashi et al. | |
| 7,889,035 B2 | 2/2011 | Hull et al. | |
| 8,003,072 B2 | 8/2011 | Cardwell et al. | |
| 8,008,826 B2 | 8/2011 | Hull et al. | |
| 8,806,950 B2 | 8/2014 | Hull et al. | |

(Continued)

FOREIGN PATENT DOCUMENTS

| | | |
|---|---|---|
| CN | 2593445 Y | 12/2003 |
| CN | 103138532 A | 6/2013 |

(Continued)

OTHER PUBLICATIONS

UK Combined Search and Examination Report for Appligation No. GB1810536.1, dated Jan. 15, 2019, 11 pgs.

(Continued)

*Primary Examiner* — Ramon M Barrera
(74) *Attorney, Agent, or Firm* — Moore IP Law

(57) ABSTRACT

An apparatus includes a chamber and a bulk superconductor disposed within the chamber. The apparatus also includes a heating element coupled to the bulk superconductor.

20 Claims, 18 Drawing Sheets

(56) References Cited

U.S. PATENT DOCUMENTS

| | | |
|---|---|---|
| 2006/0124050 A1 | 6/2006 | Tarrant et al. |
| 2006/0291112 A1 | 12/2006 | Markiewicz |
| 2015/0255200 A1 | 9/2015 | Solovyov et al. |
| 2016/0380526 A1 | 12/2016 | Hull |
| 2019/0006072 A1 | 1/2019 | Hull et al. |
| 2019/0013724 A1 | 1/2019 | Senderos et al. |

FOREIGN PATENT DOCUMENTS

| | | |
|---|---|---|
| EP | 2581956 A2 | 4/2013 |
| JP | S6426327 A | 1/1989 |
| JP | 07211546 A * | 8/1995 |
| JP | 4067749 B2 * | 3/2008 |

OTHER PUBLICATIONS

Durrell, J. H., et al., "A trapped field of 17.6T in melt-processed, bulk Gd—Ba—Cu—O reinforced with shrink-fit steel," 2014, Superconductor Science and Technology, vol. 27, 6 pgs.

Hull, John R., et al., "Applications of Bulk High-Temperature Superconductors," Oct. 2004, Proceedings of the IEEE, vol. 92, No. 10, pp. 1705-1718.

Yoon, Yong-Soo, et al., "Design, Fabrication and Testing of a Heater-Trigged High-Tc Superconducting Power Supply", IEEE Transactions on Applied Superconductivity, vol. 10, No. 1, Mar. 2000, pp. 1418-1421.

UK Search and Examination Report for Application No. GB1810536.1 dated Jun. 27, 2019, 10 pgs.

GB Examination Report for Application No. GB1810536.1 dated May 27, 2020, 4 pgs.

Haugan, Timothy J., "Design of SMES Devices for Air and Space Applications," Air Force Research Laboratory, Oct. 12, 2011, pp. 1-28.

* cited by examiner

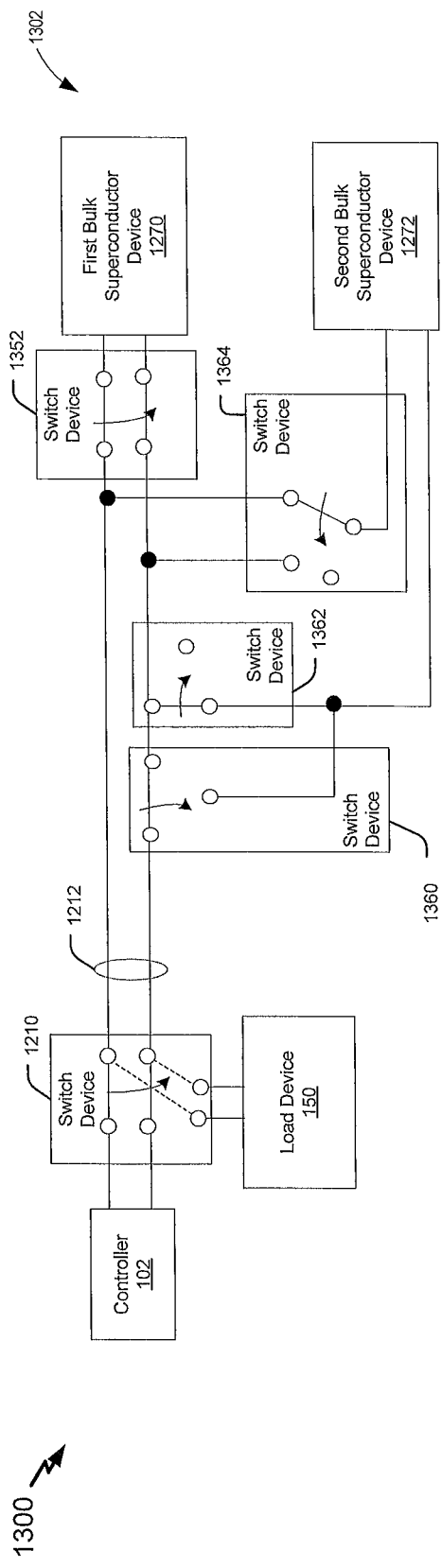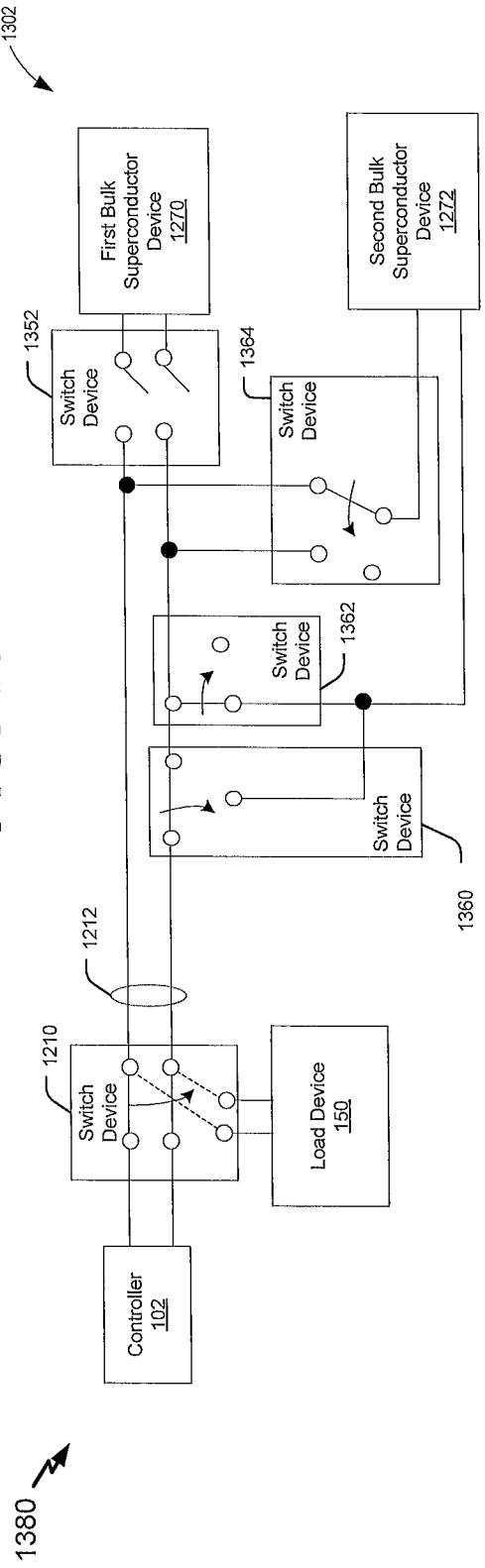

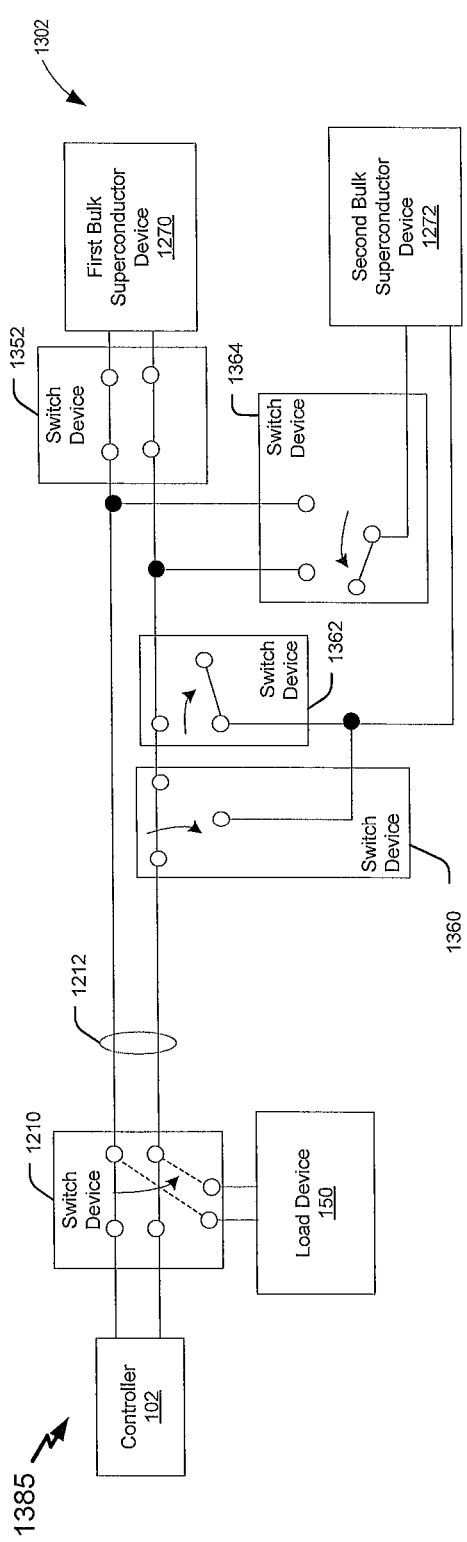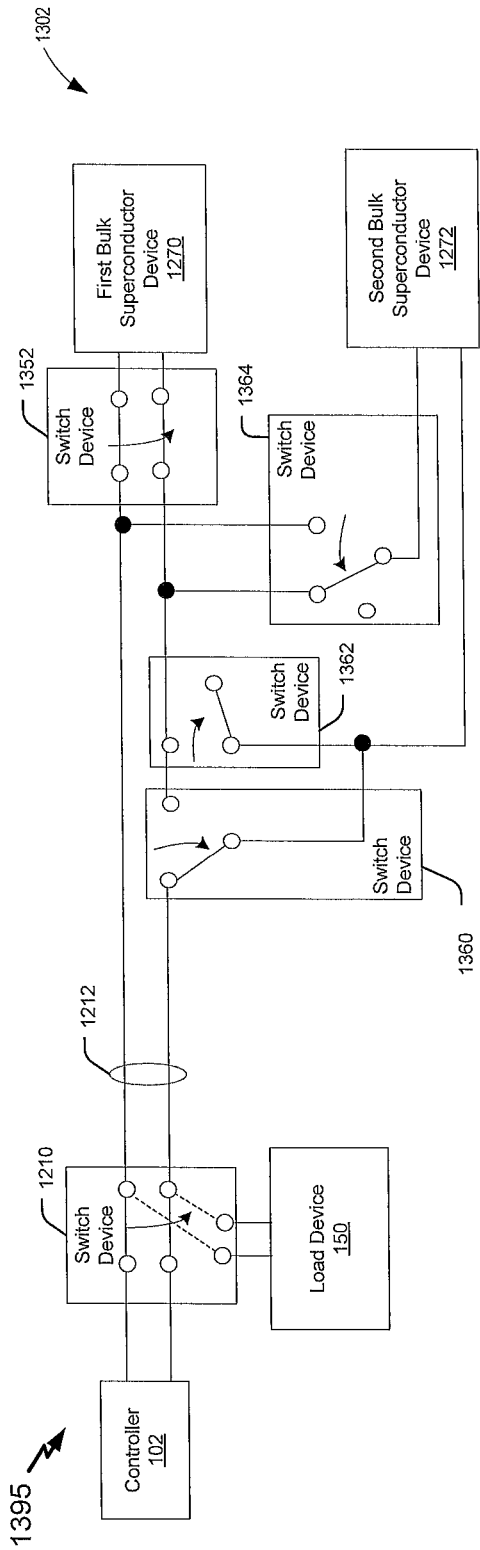
FIG. 13C
FIG. 13D

SYSTEM AND METHOD FOR OPERATING A BULK SUPERCONDUCTOR DEVICE

FIELD OF THE DISCLOSURE

The present disclosure is generally related to a bulk superconductor device.

BACKGROUND

In certain energy storage devices used for pulse-power applications, superconducting wire formed as a coil is used to store energy for long time periods and to provide a discharge of the stored energy. However, the coil (formed from superconducting wire) suffers from a relatively low-specific power (due to the large mechanical structure that contains the magnetic coil) making the coil unsuitable for many pulse-power applications. Pulse power applications typically require high specific-power (e.g., a high loading capability), such as a short interval of high peak power. Additionally, in some implementations, the coil is shielded to reduce or eliminate the high magnetic fields of the superconducting magnetic coils from causing interference with nearby equipment. In other implementations, the coil can be wound as a toroid (and a high magnetic field is maintained at an interior of the toroid). However, winding the coil in a toroid decreases the amount of magnetic stored energy that a given mass of coil can produce, thus requiring a larger mass of coil to produce the same magnetic field strength. Shielding the coil or using a larger mass of the coil increases the weight, size, and cost of the energy storage device.

SUMMARY

In a particular implementation, a bulk superconductor device includes a chamber and a bulk superconductor disposed within the chamber. The bulk superconductor device also includes a heating element coupled to the bulk superconductor.

In another particular implementation, a method of operating a bulk superconductor device includes storing magnetic energy by a bulk superconductor disposed within a chamber. The method also includes receiving, by the bulk superconductor, heat from a heating element proximate to the bulk superconductor. The method further includes, responsive to receiving the heat, discharging, by the bulk superconductor, at least a portion of the magnetic energy to induce current in a coil.

In another particular implementation, a bulk superconductor system includes a plurality of bulk superconductors including a first bulk superconductor and a second bulk superconductor. The bulk superconductor system also includes a plurality of switch devices electrically coupled to the plurality of bulk superconductors. In a first configuration of the plurality of switch devices, the plurality of bulk superconductors are coupled in series. In a second configuration of the plurality of switch devices, the plurality of bulk superconductors are coupled in parallel.

Other implementations, advantages, and features of the present disclosure will become apparent after review of the entire application, including the following sections: Brief Description of the Drawings, Detailed Description, and the Claims.

BRIEF DESCRIPTION OF THE DRAWINGS

FIGS. 13A, 13B, 13C, and 13D illustrate different configurations of the system of FIG. 12;

DETAILED DESCRIPTION

Figure 1:
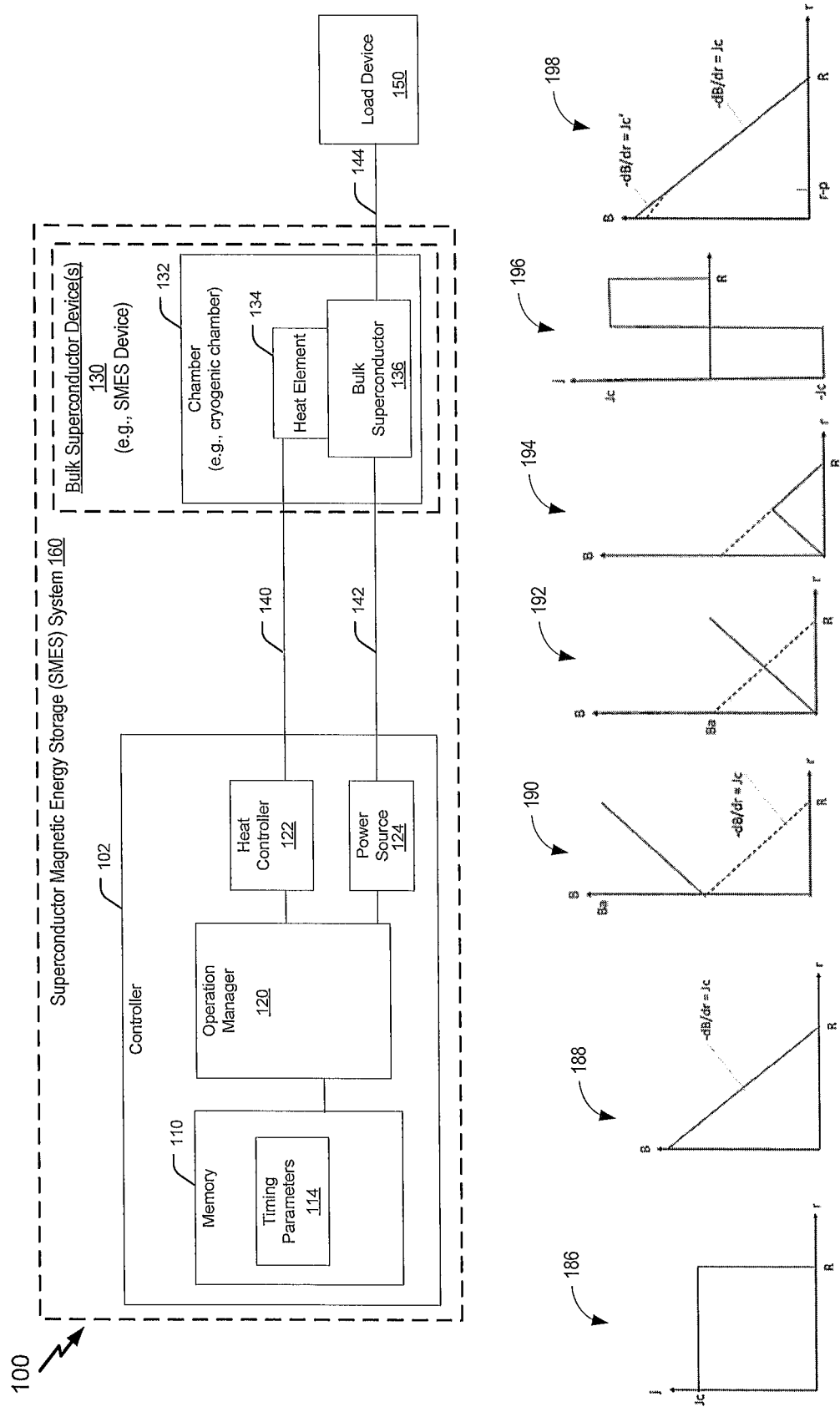
FIG. 1 is a diagram that illustrates an example of a system that includes a bulk superconductor.

Particular aspects of the present disclosure are described below with reference to the drawings. In the description, common features are designated by common reference numbers. As used herein, various terminology is used for the purpose of describing particular implementations only and is not intended to be limiting of implementations. For example, the singular forms "a," "an," and "the" are intended to include the plural forms as well, unless the context clearly indicates otherwise. It may be further understood that the terms "comprise," "comprises," and "comprising" may be used interchangeably with "include," "includes," or "including." Additionally, it will be understood that the term "wherein" may be used interchangeably with "where." As used herein, "exemplary" may indicate an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to one or more of a particular element, and the term "plurality" refers to multiple (e.g., two or more) of a particular element.

Implementations disclosed herein are directed to a bulk superconductor device (or an energy storage system that includes multiple bulk superconductor devices). The bulk superconductor device includes a bulk superconductor (e.g., having a high specific energy capability, such as greater than 150 Wh/kg) and a heat element coupled to the bulk superconductor. As used herein, "bulk superconductor" refers to a generic class of material (e.g., superconducting material) that includes large single-grain blocks and sintered structures. The bulk HTSs may also take the form of large single-grained superconductors within which circulating currents may flow at large current density without loss. For example, the bulk HTSs is capable of developing magnetizations, similar to that of permanent magnets, but with much larger magnetic fields. Accordingly, the bulk superconductor may be used as a field-trapped component in an energy storage system. The bulk superconductor is configured to be charged to store energy. The bulk superconductor is further configured to dissipate the stored energy responsive to heat provided by the heat element. In some implementations, the dissipation of the stored energy induces a current in a coil wrapped around the bulk superconductor and, responsive to the current, the coil outputs a voltage pulse that has high-specific power, such as greater than 10 kW/kg.

In some implementations, one or more bulk superconductor devices are included in a superconductor magnetic energy storage (SMES) system for a pulsed-power application. For example, the pulsed-power application may correspond to operation of a laser. In a particular implementation, the SMES system for a pulsed-power application includes multiple bulk superconductor devices arranged in an array. In some implementations, the bulk superconductor devices of the array may be arranged such that a resulting field of the SMES system is confined locally and does not cause interference (or causes relatively low interference) to equipment proximate to the SMES system (i.e., shielding is not needed for the SMES system).

In another particular implementation, the array includes a plurality of switch devices to selectively configure two or more bulk superconductor devices in different series and/or parallel combinations, such that the SMES system can output a variety of waveforms at different current and different voltages. Additionally, for the SMES system that includes the array and the plurality of switch devices, faults to a single bulk superconductor device (e.g., a fault in a single bulk superconductor or in a coil) can be isolated by opening one or more of the switch devices.

In a particular implementation, the bulk superconductor device (or an energy storage system that includes multiple bulk superconductor devices) is coupled to a load device, such a laser. The bulk superconductor device (or the energy storage system that includes multiple superconductor devices) may be controlled or otherwise operated to provide pulsed power to the load device. In some implementations, the bulk superconductor device (or an energy storage system that includes multiple bulk superconductor devices) is installed in a vehicle, such as an aircraft, a spacecraft, a watercraft, etc.

A bulk superconductor device including a bulk superconductor has high specific energy (e.g., energy per mass unit) and is able to store energy (e.g., magnetic energy) for a prolonged period of time. The energy that can be stored in the bulk superconductor is greater than energy that can stored in a similar small volume with a coil (formed from a superconductor material). Because of the ability to store a larger magnetic field, a SMES system including one or more bulk superconductors has a higher specific energy (e.g., capacity capability, such as energy per unit mass) and higher specific power (e.g., loading capability) than a conventional SMES system that utilizes a coil (formed from a superconductor material) to store energy. To clarify, while a conventional SMES system stores energy at a coil formed of a superconductor material, the devices and systems described herein store energy at a bulk superconductor, such as a cylindrical bulk of superconductor material. Thus, a SMES system (as described herein) including one or more bulk superconductors can be utilized in pulse-power applications that require high specific-power.

Referring to FIG. 1, an example of a system 100 that includes a bulk superconductor 136 is shown. The bulk superconductor 136 is included in a bulk superconductor device 130, such as a superconductor magnetic energy storage (SMES) device. In some implementations, the system 100 (e.g., a bulk superconductor system) is included in a vehicle (e.g., an aircraft, a spacecraft, etc.).

The system 100 includes a controller 102, one or more bulk superconductor devices 130, and a load device 150. The controller 102 is configured to initiate energy (e.g., magnetic energy) storage at the one or more bulk superconductor devices 130, as described further herein. The controller 102 is further configured to initiate a discharge of at least a portion of the energy stored at the one or more bulk superconductor devices 130, as described further herein.

The controller 102 includes a memory 110, an operation manager 120, a heat controller 122, and a power source 124. The memory 110 includes timing parameters 114. The timing parameters 114 include information related to charging and discharging of the one or more bulk superconductor devices 130. For example, the timing parameters indicate how long it takes to charge the bulk superconductor 136 to store a particular amount of energy.

The operation manager 120 is configured to control operation of the system 100. For example, the operation manager 120 is configured to control (e.g., initiate operation of) the heat controller 122, the power source 124, the one or more bulk superconductor devices 130, the load device 150, or a combination thereof. The heat controller 122 is configured to provide a heat control signal 140 to the one or more bulk superconductor devices 130 responsive to an output of the operation manager 120. The heat control signal 140 comprises a power signal to energize a heat element 134 (e.g., a resistive heat element). The power source 124 is configured to provide a power control signal 142 to the one or more bulk superconductor devices 130 responsive to an output of the operation manager 120. In a particular implementation, the power control signal 142 is a low voltage pulse (e.g., a 1-5 volt signal). Although the heat control signal 140 and the power control signal 142 are illustrated as a single signal (e.g., a single wire), in other implementations, the heat control signal 140 is provided via a first set of wires (e.g., a first pair of wires) and the power control signal 142 is provided via a second set of wires (e.g., a second pair of wires).

Each of the one or more bulk superconductor devices 130 includes a chamber 132, the heat element 134 (e.g., a heating element), and a bulk superconductor 136. Although the one or more bulk superconductor devices 130 are described as having a single bulk superconductor 136, in other implementations, each of the one or more bulk superconductor devices 130 may include multiple bulk superconductors 136.

The chamber 132 (e.g., a cryogenic chamber) defines a region, such as a three-dimensional space in which the heat element 134 and the bulk superconductor 136 are located. The chamber 132 houses the heat element 134 and the bulk superconductor 136. In the implementations where the bulk superconductor device 130 includes multiple bulk superconductors 136, the multiple bulk superconductors 136 are disposed within the chamber 132 (e.g., the region defined by the chamber 132). The chamber 132 may include a liquid (e.g., a cryogenic liquid), such as nitrogen. Additionally, or alternatively, the chamber 132 may include or be coupled to a cooling element, as described further with reference to FIG. 3. The cooling element is configured to conductively cool the bulk superconductor 136.

The bulk superconductor 136 is configured to store energy responsive to the power control signal 142, as described further herein. For example, the bulk superconductor 136 may be charged by pulse charging (using a coil) or by flux charging (using a flux concentrator). To illustrate, when the bulk superconductor 136 is charged using pulse charging, the bulk superconductor device 130 (that includes a coil not shown) receives the power control signal 142. Responsive to the power control signal 142, the coil generates a magnetic field that is applied to the bulk superconductor 136 to charge the bulk superconductor 136. When charged, the bulk superconductor 136 can have a trapped magnetic flux of greater than 15 Tesla.

The heat element 134 is coupled to the bulk superconductor 136. The heat element 134 is configured to receive the heat control signal 140 and to provide heat to the bulk superconductor 136. For example, the heat element 134 (e.g., a resistive heat element) is configured to generate heat responsive to the heat control signal 140 and the generated heat is transferred (e.g., via conduction) from the heat element 134 to the bulk superconductor 136. Responsive to the heat provided to the bulk superconductor 136, a discharge of energy stored at the bulk superconductor 136 occurs, as described further herein with reference to graphs 186-198. The discharge of the energy is associated with an output signal 144 provided to the load device 150 from the one or more bulk superconductor devices 130. To illustrate, in some implementations, the bulk superconductor device 130 includes an output coil (not shown) coupled to the load and configured to provide the output signal 144. The discharge of the energy stored at the bulk superconductor 136 induces a current in the coil that corresponds to the output signal 144.

Magnetization, charging, and discharging of the bulk superconductor 136 is described herein with respect to the graphs 186-198, which are based on an ideal magnetization of a cylindrical bulk superconductor (e.g., the bulk superconductor 136) of radius R. A generally accepted theory of the magnetization of a superconductor is the Bean critical state model (referred to herein as the "Bean model"). In the Bean model, during charging, the superconductor builds up a magnetic flux gradient. The gradient is determined by a critical current value which is temperature dependent. If the gradient exceeds this critical current value, flux flows into a region of lower flux density. Advanced treatments of the theory take into account the dependence of the critical current on the magnetic field, although this is usually a second-order effect, compared to the dependence on temperature.

Magnetization of the bulk superconductor 136 is described with reference to a first graph 186 and a second graph 188. The first graph 186 depicts an ideal magnetization of a cylindrical bulk superconductor of radius R. In the first graph 186, the curve represents the current density j and magnetic field B at any point in the axial direction of the cylinder. In the first graph 186, the current density is shown as a function of radius. As illustrated by the first graph 186, the current density in the bulk superconductor is at the critical current density Jc. The second graph 188 depicts a resulting magnetic field B of the current distribution depicted with respect to the first graph 186. In the second graph 188, the magnetic field peaks in the center and falls off linearly with radius and is zero at radius R of the bulk. The slope of the line shown by the second graph 188 is directly related to the critical current density Jc. Accordingly, a higher critical current density Jc can result in a higher magnetization, i.e., higher magnetic field B.

Charging of the bulk superconductor 136 is described with reference to a third graph 190, a fourth graph 192, a fifth graph 194, and a sixth graph 196. In a situation in which an un-magnetized bulk superconductor is cold (e.g., below its critical temperature and at its operating temperature), pulse charging may be used to charge (e.g., magnetize) the bulk superconductor. The idealized behavior of the superconductor to an externally applied field is shown with respect to the graphs 190-196. The third graph 190 reflects a magnetic field Ba that is applied at the outer radius of the bulk superconductor, and the solid line in the third graph 190 represents the magnetization within the bulk superconductor. When the applied magnetic field Ba is removed, the field becomes that of the dashed line, and the magnetization and current distribution of the bulk superconductor corresponds to the first graph 186 and the second graph 188. To achieve the magnetization and current distribution of the bulk superconductor of the first graph 186 and the second graph 188, the applied magnetic field Ba is twice the value of the resulting field at the second of the bulk superconductor when the applied magnetic field Ba is removed.

If the applied magnetic field Ba is less than the value to achieve the magnetization and current distribution of the bulk superconductor of the first graph 186 and the second graph 188, the magnetization is less than that shown in graphs 186-188. For example, if the applied magnetic field Ba is one times (e.g., 1x) of the maximum possible magnetization, as shown in the fourth graph 192, then the magnetization shown by the solid line of the fifth graph 194 results when the applied magnetic field Ba is removed. The maximum trapped magnetic field is half of the applied magnetic field Ba and the trapped magnetic field is not at the center of the cylinder, but at a radius half that of the cylinder of the bulk superconductor. The current distribution within the superconductor is shown in the sixth graph 196.

In the above description of charging the bulk superconductor according to the ideal case, it has been assumed that the applied magnetic field Ba changes arbitrarily slowly and that the temperature remains constant. However, it is understood that in most applications (e.g., non-ideal applications), charging of the bulk superconductor is more complex because the temperature varies as the magnetic flux moves into the bulk superconductor. Additionally, it is noted that when pulsed charging is used to charge the bulk superconductor, a pulse charge is of finite time length.

Discharging of the bulk superconductor 136 is described with reference to a seventh graph 198. With respect to discharging, the bulk superconductor is assumed to have the magnetization as described with reference to the graphs 186-188. If an amount of heat is applied in a patch of radius R-p at the center of the bulk superconductor, the increased temperate in the patch reduces the critical current in the patch to Jc' and, as shown in the seventh graph 198, the maximum slope of the magnetic field gradient decreases. Since the slope of the magnetic flux versus radius is larger than the critical value in the patch, some of the excess flux moves to a larger radius. Movement of the flux has two effects. One effect is that the flux motion heats up the bulk superconductor in the location in which the flux moves.

Another effect is that the flux motion increases the magnetic field gradient in the location in which the flux moves. Since this flux was already at a maximum gradient and because the value of the maximum gradient has decreased because of the rise in temperature, the flux in this new region becomes unstable, and the flux in the new region moves to a larger radius. The entire process cascades to the outer radius of the bulk superconductor where a portion of the flux is dissipated.

During operation, the controller 102 initiates charging of the one or more bulk superconductor devices 130. For example, the controller 102 provides the power control signal 142 to the one or more bulk superconductor devices 130 to pulse charge or flux charge one or more bulk superconductors, such as the bulk superconductor 136. To illustrate, based on the timing parameters 114, the controller 102 provides the power control signal 142 to the one or more bulk superconductor devices 130 a number of times (each time for a particular duration) to charge the bulk superconductor 136 to store a particular amount of energy. In a particular example, the power control signal 142 is provided to each of the one or more bulk superconductor devices 130. To illustrate, the power control signal 142 may correspond to a voltage (e.g., 3 volts) that is provided to a charging coil of the bulk superconductor 136.

After the one or more bulk superconductor devices 130 is charged, the controller 102 initiates discharge of at least one of the one or more bulk superconductor devices 130. For example, the controller 102 may initiate the discharge based on the timing parameters 114 or based on an input signal (received at the controller 102) that requests operation of the load device 150. To initiate the discharge, the controller 102 provides the heat control signal 140 to a heat element, such as the heat element 134. The heat element 134 provides heat which causes an increase in a temperature of the bulk superconductor 136 and which initiates a rapid discharge of energy stored at the bulk superconductor 136. For example, heat generated by the heat element 134 is transferred (e.g., via conduction) to the bulk superconductor 136 to increase the temperature of the bulk superconductor 136. The discharge of energy generates a voltage (e.g., a pulse) in a coil wrapped around the bulk superconductor 136. For example, the discharge of energy induces a current in the coil which corresponds to the voltage. The voltage (e.g., the pulse) is provided as the output signal to the load device 150, such as a laser. The output signal of the one or more bulk superconductor devices 130 is received as an input to the load device 150.

As described herein, the power control signal 142 is provided to the one or more bulk superconductor devices 130 prior to the heat control signal 140 being provided to the heat element 134. In other implementations, the heat control signal 140 may be provided to the heat element 134 while the power control signal 142 is provided to the one or more bulk superconductor devices 130. For example, the heat control signal 140 having a first voltage value is provided to the heat element 134 during charging of the one or more bulk superconductor devices 130 (e.g., while the power control signal 142 is provided to the one or more bulk superconductor devices 130). The heat control signal 140 having a second voltage value is provided to the heat element 134 during discharge of the one or more bulk superconductor devices 130 (e.g., while the power control signal 142 is not provided to the one or more bulk superconductor devices 130).

In a particular implementation, a SMES system 160 includes the controller 102 and the one or more bulk superconductor devices 130. If a temperature of the one or more bulk superconductor devices 130 is maintained (e.g., at a low enough temperature) to avoid discharge, the one or more bulk superconductor devices 130 is configured to store energy for a prolonged period of time (e.g., a number of years, such as greater than 10 years). Because of the ability to store a larger magnetic field, the bulk superconductor 136 has a higher specific energy (e.g., greater than 150 Wh/kg) and higher specific power (e.g., greater than 10 kW/kg) than a conventional SMES system 160. Thus, a SMES system 160 including one or more bulk superconductors 130 can be utilized in pulse-power applications that require high specific-power.

Additionally, in a SMES system 160 that includes multiple bulk superconductor devices, the multiple bulk superconductor devices can be arranged in an array, as described with reference to FIGS. 10 and 11. In a particular implementation, the array (e.g., bulk superconductor devices of the array) is configurable in different series and/or parallel combinations, as described with reference to FIGS. 13A-13D, such that dissipation of energy from individual bulk superconductors can be triggered in time order to create a variety of waveforms of different currents and voltages. For example, as described further with reference to FIGS. 13A-13D, an array of bulk superconductor devices includes a plurality of switch devices. The plurality of switch devices is configurable to isolate a particular bulk superconductor device, to configure a first set of two or more bulk superconductor devices in parallel, to configure a second set of two or more bulk superconductor devices in series, or a combination thereof.

Additionally, for a SMES system 160 that includes the array of multiple bulk superconductor devices, faults to a single bulk superconductor device (e.g., a fault in a bulk superconductor or in a coil) can be can be isolated, as described with reference to FIGS. 13A-13D, and have a small impact on a total energy storage capacity. Testing of the bulk superconductor device 130 and identification of a fault at the bulk superconductor device 130 is described further herein with reference to FIG. 2.

As described herein, the system 100 includes a bulk superconductor device 130 having a bulk superconductor 136. The bulk superconductor 136 is configured to store energy and to dissipate the stored energy responsive to heat provided by the heat element. Dissipation of the stored energy generates a pulse (e.g., voltage in a coil) for use in pulsed-power applications. The SMES system 160 including the bulk superconductor 136 provides a high specific-power energy (e.g., greater than 150 Wh/kg) source suitable for use in pulsed-power applications.

Figure 2:
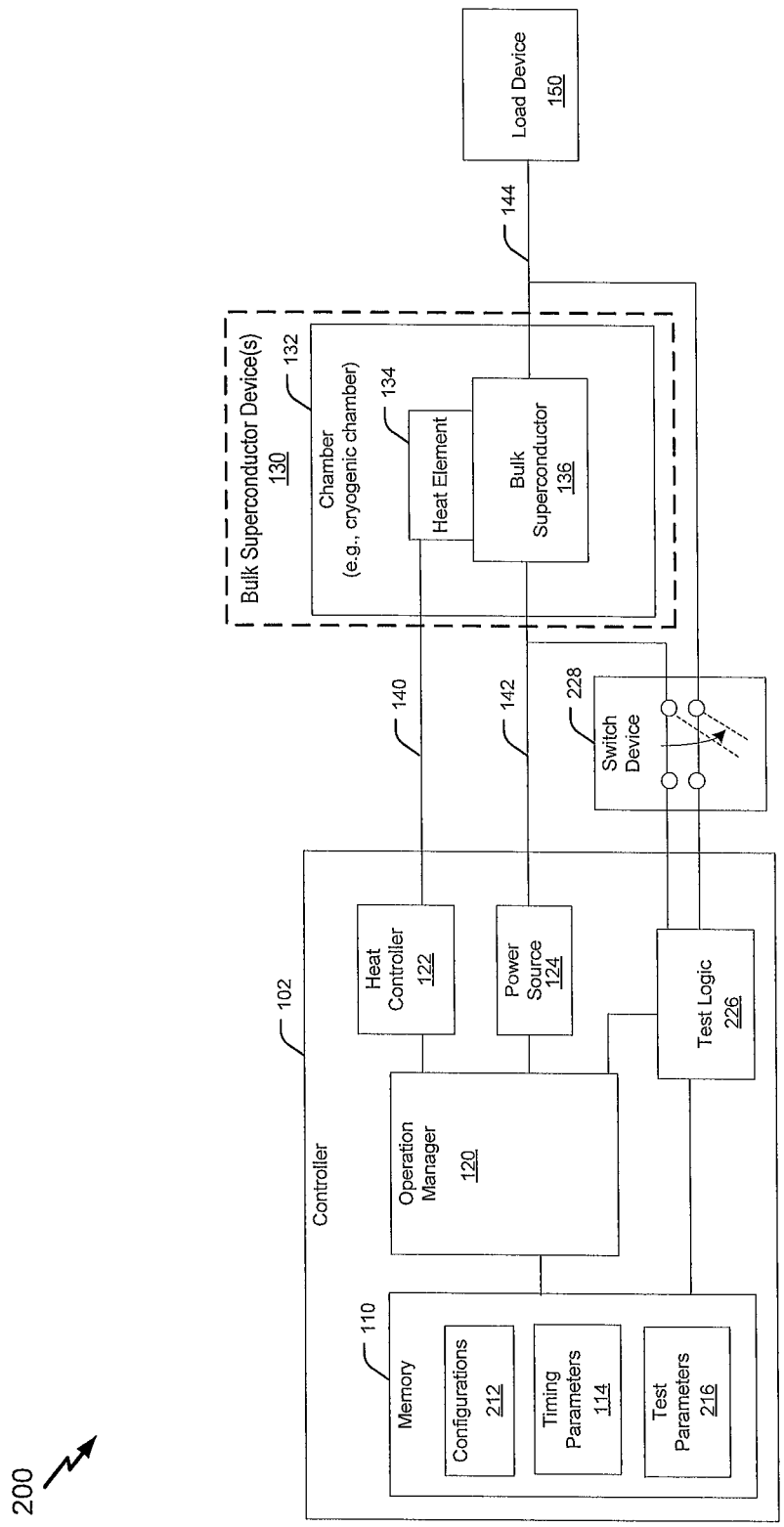
FIG. 2 is a diagram that illustrates an example of another system that includes the bulk superconductor device of FIG. 1.

Referring to FIG. 2, an example of a system 200 that includes a bulk superconductor device 130 is shown. The system 200 includes the controller 102, the one or more bulk superconductor devices 130, the load device 150, and a switch device 228 (e.g., a test switch device).

The controller 102 includes the memory 110, the operation manager 120, the heat controller 122, the power source 124, and test logic 226. The memory 110 includes one or more configurations 212, the timing parameters 114, and test parameters 216. The one or more configurations 212 correspond to different switch configurations associated with the one or more bulk superconductor devices 130. For example, as described further with reference to FIGS. 12 and 13A-13D, an array of bulk superconductor devices includes a plurality of switch devices 1352-1364. The plurality of switch devices 1352-1364 is configurable, according to the one or more configurations 212, to isolate a particular bulk superconductor device, to configure a first set of two or more bulk superconductor devices in parallel, to configure a second set of two or more bulk superconductor devices in series, or a combination thereof.

The test parameters 216 include information related to test input values, test output values, acceptable operating values or ranges of the one or more bulk superconductor devices 130, or a combination thereof.

The operation manager 120 is configured to control (e.g., initiate operation of) the heat controller 122, the power source 124, the test logic 226, the switch device 228, the one or more bulk superconductor devices 130, the load device 150, or a combination thereof. The test logic 226 is configured to monitor operation of the one or more bulk superconductor devices 130, as described further herein. The switch device 228 is configured to selectively couple the test logic 226 to the one or more bulk superconductor devices 130. To illustrate, the switch device 228 is configured to selectively couple the test logic 226 to receive the power control signal 142 and the output signal 144.

During operation, the controller 102 configures the one or more bulk superconductor devices 130 for charging. For example, the one or more bulk superconductor devices 130 may be configured in series as shown in FIG. 13D, in parallel as shown in FIG. 13A, or a combination thereof. After configuration of the one or more bulk superconductor devices 130, the controller 102 initiates charging of the one or more bulk superconductor devices 130 as described above with reference to the system 100 of FIG. 1.

After the one or more bulk superconductor devices 130 is charged, the controller 102 configures the one or more bulk superconductor devices 130 for discharge. For example, the one or more bulk superconductor devices 130 may be configured in series, in parallel, or a combination thereof. After configuring the one or more bulk superconductor devices 130 for discharge, the controller 102 initiates discharge of at least one of the one or more bulk superconductor devices 130 as described above with reference to the system 100 of FIG. 1.

In some implementations, the controller 102 is configured to test the one or more bulk superconductor devices 130. For example, the controller 102 is configured to send control signals to configure one or more switch devices for testing of the one or more bulk superconductor devices. To illustrate, responsive to the control signals, the switch device 228 operates to couple the test logic 226 to at least one of the one or more bulk superconductor devices 130. During a testing operation, the controller 102 initiates storage of energy at the bulk superconductor 136 of the at least on bulk superconductor device as described above with reference to the system 100 of FIG. 1. After storage of the energy at the bulk superconductor 136, the controller 102 initiates a discharge of the energy stored at the bulk superconductor 136. The test logic 226 receives a pulse responsive to the discharge of the energy. The test logic 226 compares characteristics of the pulse (e.g., an input voltage value, an output voltage value, an input current value, an output current value, an output pulse duration, etc.) to the test parameters 216 to determine whether or not a particular bulk superconductor device (that includes the bulk superconductor 136) is working properly (e.g. properly charging and discharging). If the particular bulk superconductor device is determined to be faulty, the controller 102 sends control signals to one or more switch devices to isolate the particular superconductor device, as described with reference to FIGS. 13A-13D.

Referring to FIGS. 3-9, examples of the bulk superconductor device 130 are depicted. In FIGS. 3-9, the examples include cross-sectional diagrams (of the bulk superconductor device 130) to illustrate basic geometry of an energy storage component (e.g., the bulk superconductor 136). With reference to FIGS. 3-9, the bulk superconductor 136 has a cylindrical geometry. Although the bulk superconductor 136 is described as having a cylindrical geometry, the bulk superconductor 136 may have an alternative geometry, such as a cube geometry.

Although the examples of FIGS. 3-9 are each described as separate examples, this is for illustration purposes and it is noted that an aspect of one example may be combined with another aspect of a different example. Additionally, although each of the examples of FIGS. 3-9 describe the bulk superconductor device 130 as including a single bulk superconductor (e.g., the bulk superconductor 136), this is for illustration purposes and it is noted that the bulk superconductor device 130 may include multiple bulk superconductors. Accordingly, none of the examples of FIGS. 3-9 is to be considered limiting.

Figure 3:
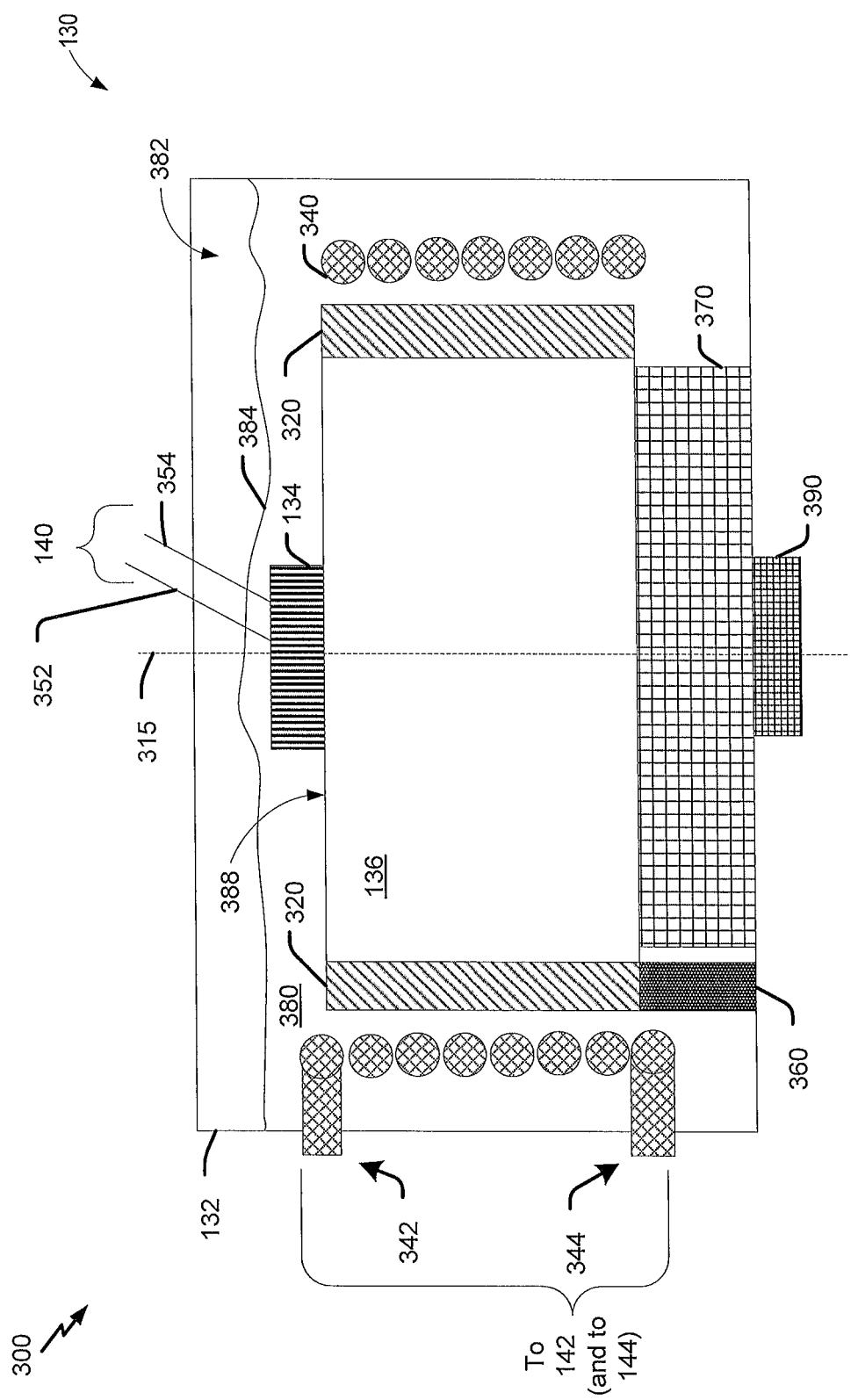
FIG. 3 is a diagram that illustrates an example of the bulk superconductor device of FIG. 1.

Referring to FIG. 3, an example of the bulk superconductor device 130 is depicted and designated 300. The example 300 of the bulk superconductor device 130 includes the chamber 132 (e.g., a cryogenic chamber), the heat element 134, and the bulk superconductor 136. The bulk superconductor 136 has a cylindrical geometry that is associated with a centerline 315.

The heat element 134 and the bulk superconductor 136 are located within the chamber 132. The heat element 134 is proximate to a first surface 388 of the bulk superconductor 136. For example, the heat element 134 is coupled to the bulk superconductor 136. In some implementations, the heat element 134 is in direct physical contact with the bulk superconductor 136. In other implementations, the heat element 134 is coupled to the bulk superconductor 134 via a thermal interface (e.g., a thermally conductive material). The heat element 134 (e.g., resistive heat element) includes a plurality of electrical leads, e.g., electrical leads 352, 354, which penetrate (e.g., pass through) a wall of the chamber 132. The leads 352, 354 are configured to receive the heat control signal 140 of FIG. 1. For example, the leads 352, 354 are configured to be coupled to the heat controller 122 and the heat element 134 is configured to be energized (and to generate heat) responsive to a voltage of the heat control signal 140 provided to the leads 352, 354.

The bulk superconductor 136 is coupled (e.g., mechanically connected) to the chamber 132 by one or more support structures, such as a representative support structure 360. The support structure 360 provides localized mechanical structural support for the individual bulk superconductor 136 at the bulk superconductor device 130. The support structure 360 may be directly coupled to the bulk superconductor 136 or may be coupled to the bulk superconductor 136 via one or more intervening structures.

The bulk superconductor device 130 includes a reinforcement structure 320. In some implementations, the reinforcement structure 320 is shrink fit around the bulk superconductor 136 on an outer radial surface of the bulk superconductor 136. In other implementations, the reinforcement structure 320 is affixed or otherwise secured around the bulk superconductor 136 in a manner other than shrink fitting the reinforcement structure 320. The reinforcement structure 320 may include one or more stainless-steel bands, one or more other bands, or a combination thereof.

A coil 340 (e.g., an electrically conductive coil) surrounds the bulk superconductor 136 (and the reinforcement structure 320). The coil 340 includes (e.g., is coupled to) a plurality of leads, such as electrical leads 342, 344, which penetrate (e.g., pass through) a wall of the chamber 132. The leads 342, 344 are configured to receive the power control signal 142 of FIG. 1. For example, the leads 342, 344 are configured to be coupled to the power source 124. Additionally, or alternatively, the leads 342, 344 are coupled to the load device 150 and are configured to provide the output signal 144 of FIG. 1. For example, as described further with reference to FIG. 12, the leads 342, 344 may be coupled to a switch device 1210 that is configured to selectively couple the leads 342, 344 to the controller 102 (to receive the power control signal 142) or to the load 150 (to provide the output signal 144).

The coil 340 is located within the chamber 132 and is configured to generate, responsive to current through the coil 340, a magnetic field to charge the bulk superconductor 136. Although the coil 340 is depicted at the same axial location (corresponding to the centerline 315) as the bulk superconductor 136, in other implementations, the coil 340 may alternatively be axially displaced to, but still concentric with, the bulk superconductor 136.

The chamber 132 includes a liquid 380 (e.g., a liquid cryogen) and a solid 370. The solid 370 may include a block of solid nitrogen. In an alternative implementation of the bulk superconductor device 130, the solid 370 is omitted. The liquid 380 may include one or more substances, such a liquid nitrogen, liquid neon, or both. In implementations where the liquid includes multiple substances (e.g., liquid nitrogen and liquid neon), the liquid 380 may be referred to as a "mixture". In a particular implementation that includes a mixture of nitrogen and neon, the mixture has a boiling point between that of the boiling point of nitrogen (i.e., 77 kelvin K) and a boiling point of neon (i.e., 28 K), depending on the composition of the mixture. The chamber 132 also includes a gas space 382 that includes evaporated components of the liquid 380. The liquid 380 and the evaporated components interact at an interface 384 (e.g., a surface of the liquid 380). The liquid 380, the solid 370, or both, are configured to cool the bulk superconductor 136 within the chamber 132.

The bulk superconductor device 130 includes a cooling element 390, such as a cryocooler. The cooling element 390 is configured to conductively cool the bulk superconductor 136, the solid 370, the liquid 380, or a combination thereof. The cooling element 390 includes leads (not shown) that are configured to be coupled to the controller 102. Although the cooling element 390 is described as being external to the chamber 132, in other implementations, the cooling element 390 is located within the chamber 132. In a particular implementation where the cooling element 390 is located within the chamber 132, the leads of the cooling element 390 penetrate (e.g., pass through) a wall of the chamber 132 and a cold head of the cooling element 390 may provide conduction cooling directly or through a thermally conductive material.

To enable the controller 102 to regulate a temperature of the bulk superconductor 136, the liquid 380, the solid 370, or a combination thereof, the bulk superconductor device 130 may include a temperature sensor (not shown). For example, in a particular implementation, the chamber 132 includes a temperature sensor configured to provide temperature data to the controller 102. The temperature sensor may be coupled to (e.g., in contact with) the bulk superconductor 136, the reinforcement structure 320, the liquid 380, the solid 370 or a combination thereof.

A strength of a magnetic field that can be trapped by the bulk superconductor 136 may be related to critical current of the bulk superconductor 136. The critical current of the bulk superconductor 136 increases as the temperature of the bulk superconductor 136 decreases. Thus, the bulk superconductor 136 may be operated at a temperature less than the freezing point of the liquid 380 or the solid 370. To illustrate, the bulk superconductor 136 may be operated at a temperature less than a freezing point of nitrogen, as an illustrative, non-limiting example.

Figure 4:
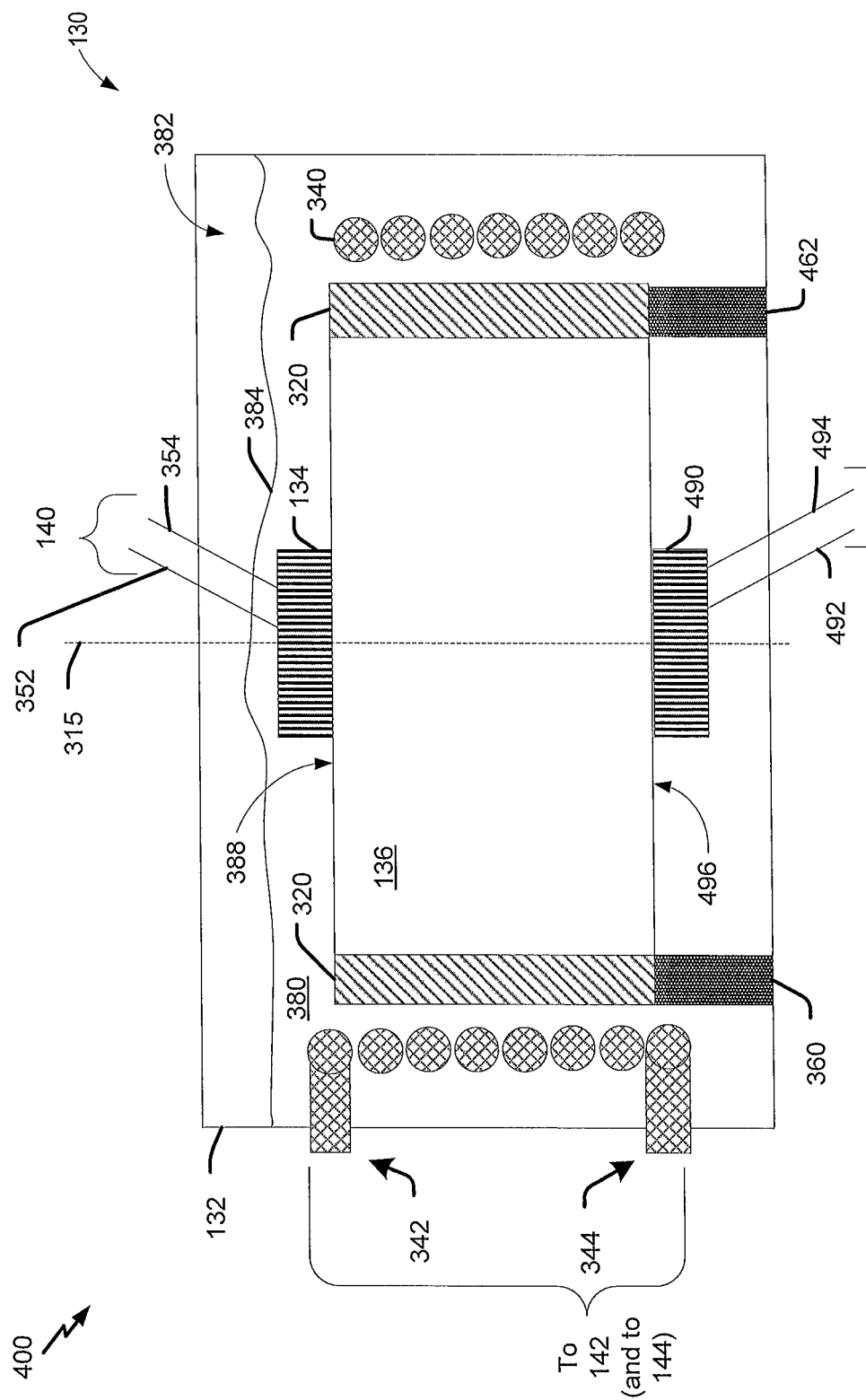
FIG. 4 is a diagram that illustrates another example of the bulk superconductor device of FIG. 1.

Referring to FIG. 4, another example of the bulk superconductor device 130 is depicted and designated 400. The example 400 of the bulk superconductor device 130 includes an additional support structure 462 and a second heat element 490. The additional support structure 462 may be directly coupled to the bulk superconductor 136 or may be coupled to the bulk superconductor 136 via one or more intervening structures.

The second heat element 490 is located within the chamber 132 and is proximate to a second surface 496 of the bulk superconductor 136. The second surface 496 (e.g., a second side) of the bulk superconductor 136 is opposite the first surface 388 (e.g., a first side) of the bulk superconductor 136. In some implementations, the second heat element 490 is in direct physical contact with the bulk superconductor 136. The second heat element 490 includes a plurality of electrical leads, e.g., electrical leads 492, 494, which penetrate (e.g., pass through) a wall of the chamber 132. The leads 492, 494 are configured to receive the heat control signal 140 of FIG. 1. For example, the leads 492, 494 are configured to be coupled to the heat controller 122.

As compared to the example 300 of FIG. 3, the example 400 of the bulk superconductor device 130 does not include the solid 370 and the cooling element 390. In an alternative implementation of the example 400, the bulk superconductor device 130 includes the solid 370, the cooling element 390, or both.

Figure 5:
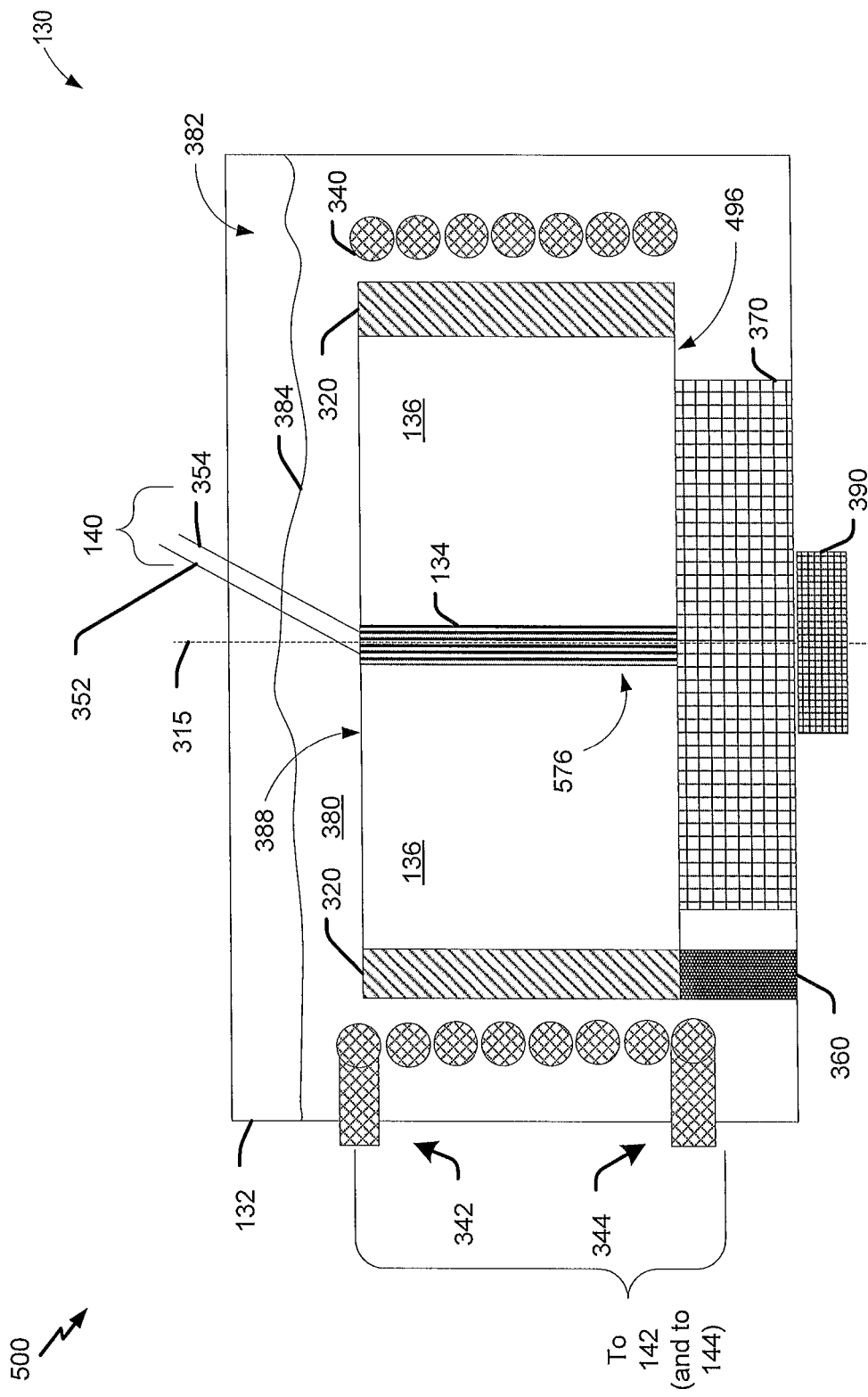
FIG. 5 is a diagram that illustrates another example of the bulk superconductor device of FIG. 1.

Referring to FIG. 5, another example of the bulk superconductor device 130 is depicted and designated 500. In the example 500, the heat element 134 is located within a cavity 576 of the bulk superconductor 136. In some implementations, the cavity 576 extends through a portion of the bulk superconductor 136 along the centerline 315. Additionally, or alternatively, the cavity 576 may extend from the first surface 388 to the second surface 496. As compared to the example 300 of FIG. 3, heating and flux flow is more uniformly distributed axially along the bulk superconductor 136 in the example 500.

Figure 6:
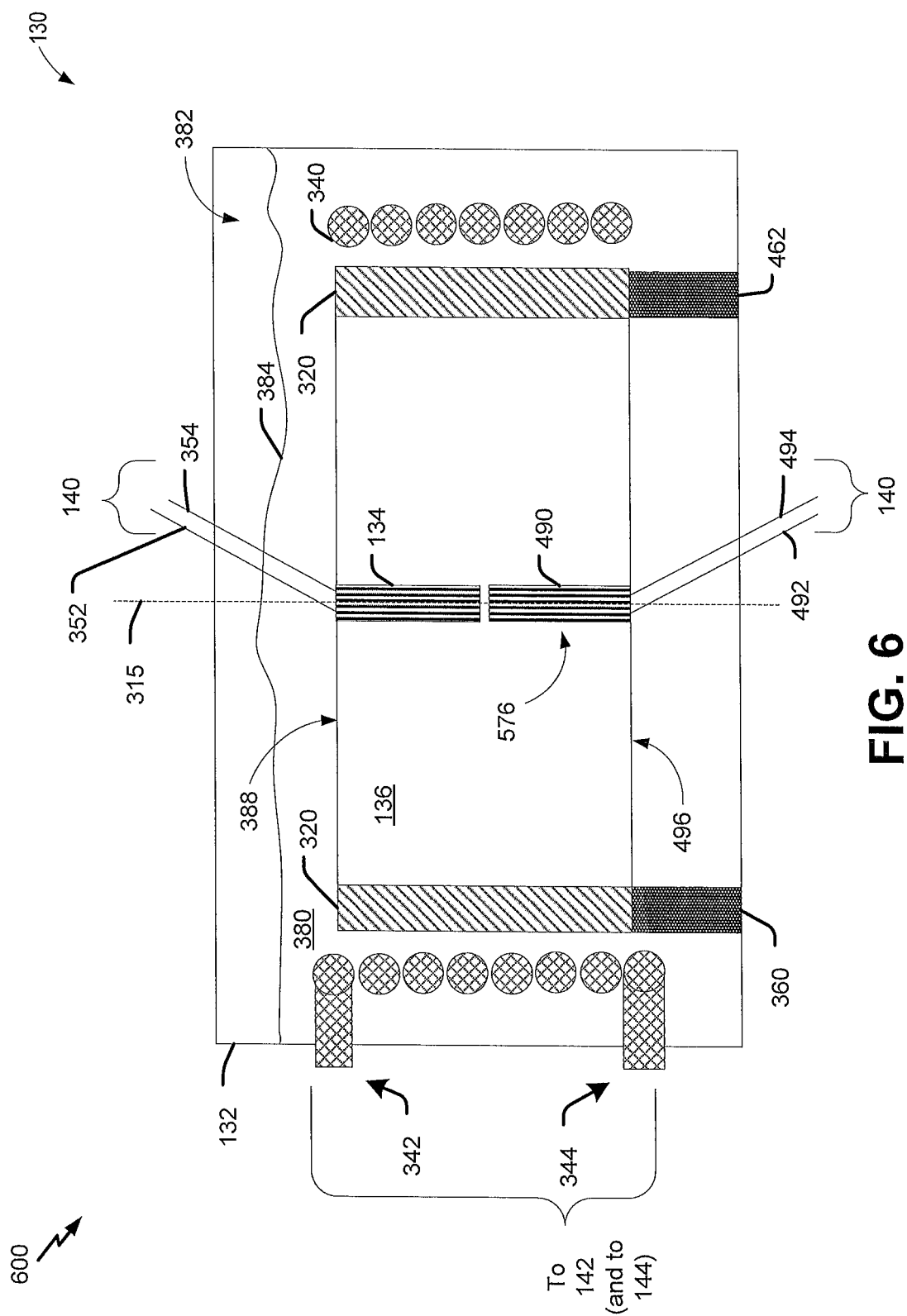
FIG. 6 is a diagram that illustrates another example of the bulk superconductor device of FIG. 1.

Referring to FIG. 6, another example of the bulk superconductor device 130 is depicted and designated 600. The example 600 illustrates the heat elements 134, 490 located within the bulk superconductor 136. In a first implementation, the heat elements 134, 490 are located within the same cavity (e.g., the cavity 576) of the bulk superconductor 136. In a second implementation, the heat elements 134, 490 are located in separate cavities such that the heat element 134 is located within a first cavity of the bulk superconductor 136 and the heat element 490 is located within a second cavity of the bulk superconductor 136. Although both the heat elements 134, 490 are described as being located within a cavity of the bulk superconductor 136, in other implementations, one of the heat elements 134, 490 is located within the bulk superconductor 136 while the other of the heat elements 134, 490 is coupled to (e.g., located on) the first surface 388 or the second surface 496.

As compared to the example 300 of FIG. 3, the example 600 of the bulk superconductor device 130 does not include the solid 370 and the cooling element 390. In an alternative implementation of the example 600, the bulk superconductor device 130 includes the solid 370, the cooling element 390, or both.

Figure 7:
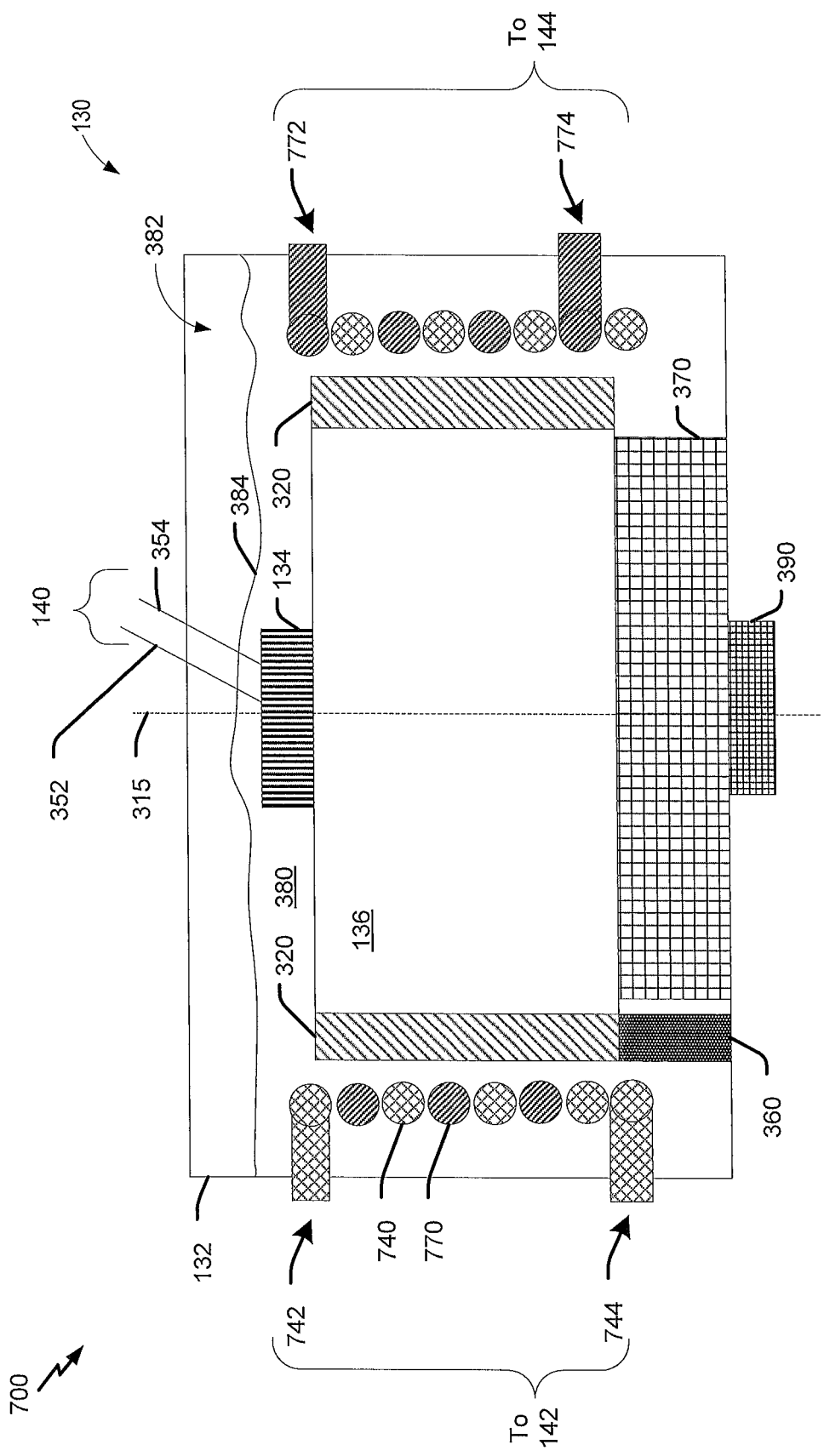
FIG. 7 is a diagram that illustrates another example of the bulk superconductor device of FIG. 1.

Referring to FIG. 7, another example of the bulk superconductor device 130 is depicted and designated 700. In the example 700, the bulk superconductor device 130 includes a first coil 740 (e.g., an input coil) and a second coil 770 (e.g., an output coil). Each of the coils 740, 770 surrounds the bulk superconductor 136 (and the reinforcement structure 320). The first coil 740 and the second coil 770 may have the same number of turns or may have a different number of turns. Although each of the coils 740, 770 is depicted at the same axial location (corresponding to the centerline 315) as the bulk superconductor 136, in other implementations, one or both of the coil 740, 770 may alternatively be axially displaced to, but still concentric with, the bulk superconductor 136.

The first coil 740 includes (e.g., is coupled to) a plurality of leads, such as electrical leads 742, 744, which penetrate (e.g., pass through) a wall of the chamber 132. The leads 742, 744 are configured to receive the power control signal 142 of FIG. 1. For example, the leads 742, 744 are configured to be coupled to the power source 124.

The second coil 770 includes (e.g., is coupled to) a plurality of leads, such as electrical leads 772, 774, which penetrate (e.g., pass through) a wall of the chamber 132. The leads 772, 774 are configured to provide the output signal 144 of FIG. 1. For example, the leads 772, 774 are configured to be coupled to the load device 150. By having separate coils for charging of the bulk superconductor 136 and for discharging the bulk superconductor 136 the example 700 of the bulk superconductor device 130 can be designed to provide an output voltage customized for a load device, such as the load device 150. Thus, the bulk superconductor device 130 can be coupled the load device 150 without a transformer positioned between.

Figure 8:
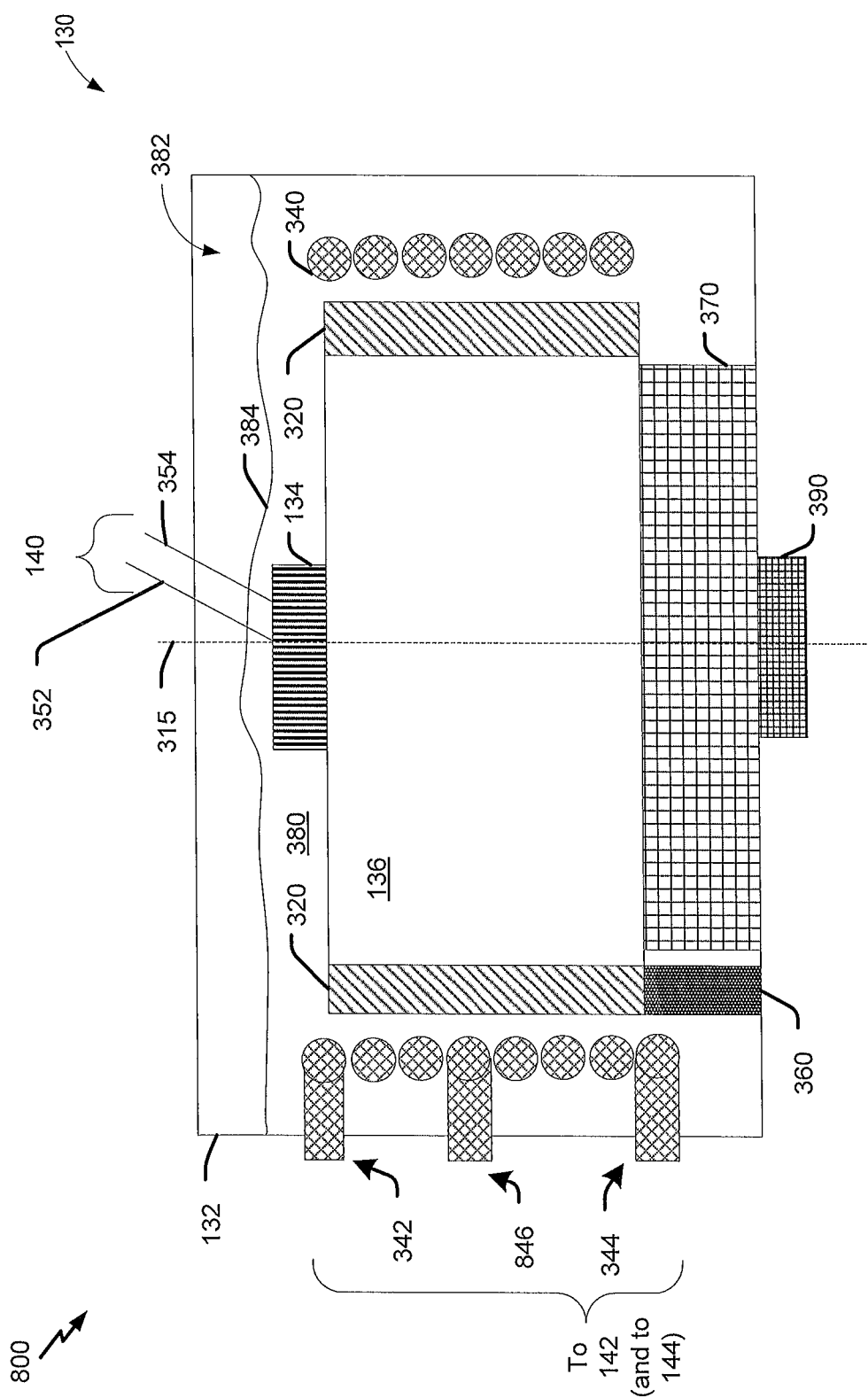
FIG. 8 is a diagram that illustrates another example of the bulk superconductor device of FIG. 1.

Referring to FIG. 8, another example of the bulk superconductor device 130 is depicted and designated 800. In the example 800, the coil 340 includes (e.g., is coupled to) a plurality of leads, such as a first lead 342, a second lead 344, and a third lead 846. The leads 342, 344, 846 penetrate (e.g., pass through) a wall of the chamber 132. The leads 342, 344, 846 are configured to receive the power control signal 142 of FIG. 1. For example, the leads 342, 344, 846 are configured to be coupled to the power source 124. Additionally, or alternatively, the leads 342, 344, 846 are coupled to the load device 150 and are configured to provide the output signal 144 of FIG. 1.

In a particular implementation, the leads 342, 344 are configured to receive the power control signal 142, and the leads 846, 344 are configured to provide the output signal 144. In another particular implementation, the leads 846, 344 are configured to receive the power control signal 142, and the leads 342, 344 are configured to provide the output signal 144. By having one or more taps of the coil 340, the example 800 of the bulk superconductor device 130 can be designed to provide an output voltage customized for a load device, such as the load device 150. Thus, the bulk superconductor device 130 can be coupled to the load device 150 without a transformer positioned between.

Figure 9:
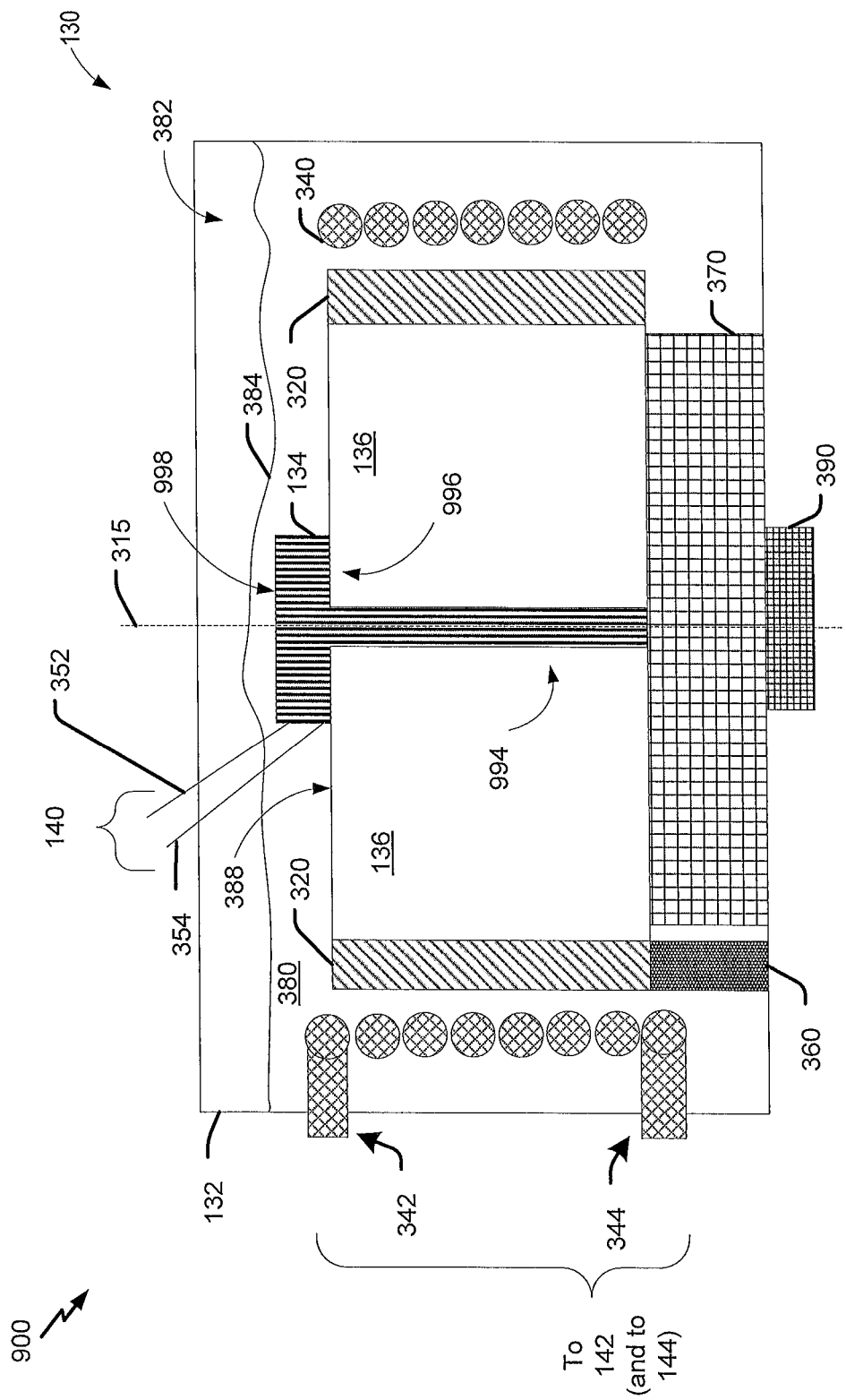
FIG. 9 is a diagram that illustrates another example of the bulk superconductor device of FIG. 1.

Referring to FIG. 9, another example of the bulk superconductor device 130 is depicted and designated 900. In the example 900, the heat element 134 is located within and external to a cavity (e.g., the cavity 576) of the bulk superconductor 136. To illustrate, a first portion 994 of the heat element 134 is located within the cavity and a second portion 996 is located external to the cavity. In a particular implementation, the second portion 996 of the heat element 134 is in contact with the first surface 388 of the bulk superconductor 136.

Although the heat element 134 is described as having two portions, in another implementation, the heat element 134 includes more than two portions. For example, the heat element 134 may include a third portion protruding from the surface 998. The third portion may extend into a cavity of a second bulk superconductor that is in a stacked configuration with respect to the bulk superconductor 136. A stacked configuration of two bulk superconductors is described with reference to FIG. 11. Additionally, in a particular implementation including the stacked configuration of two bulk superconductors, the surface 998 is coupled to (in contact with) a surface of the second bulk superconductor.

Figure 10:
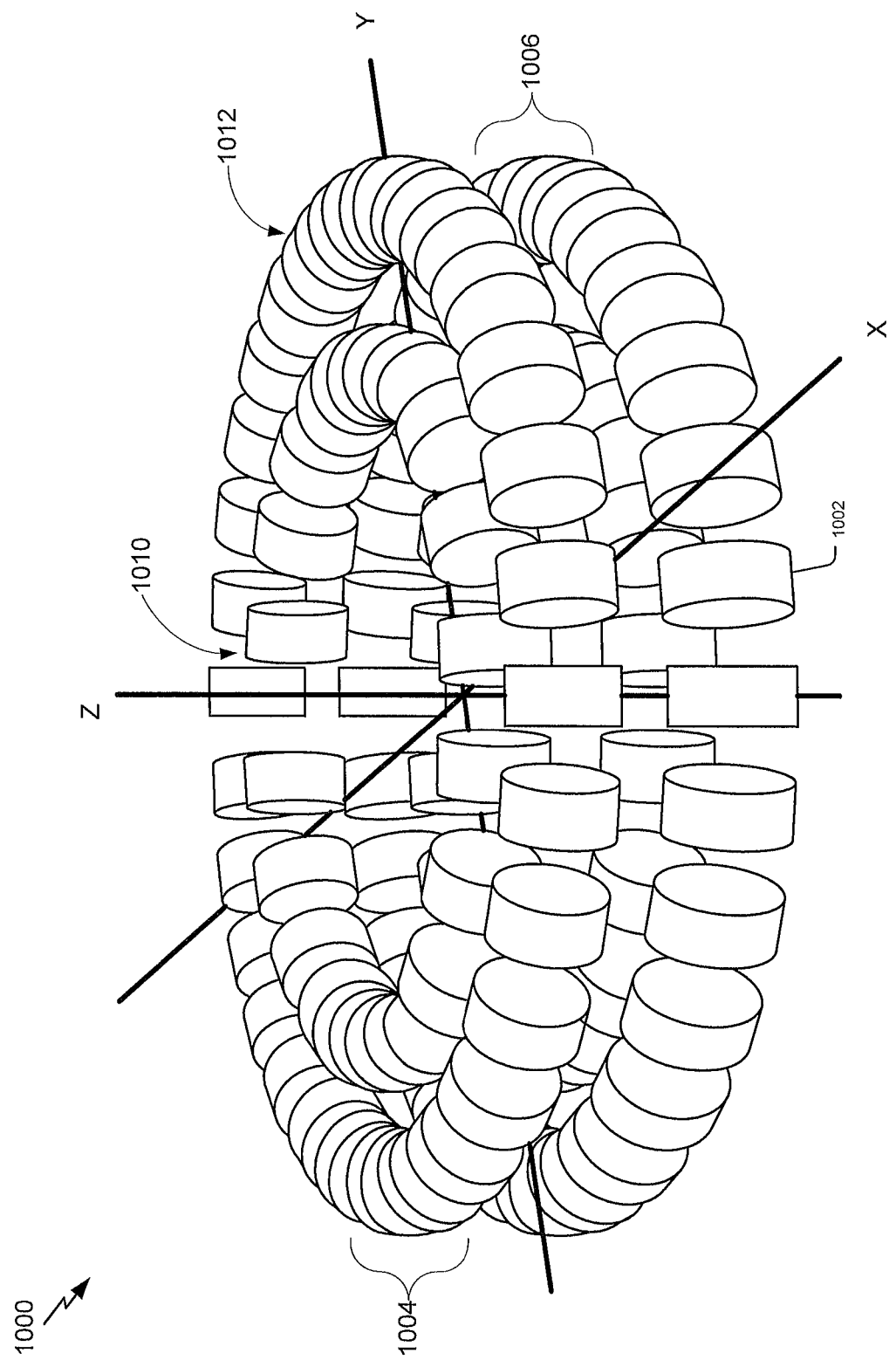
FIG. 10 is a diagram that illustrates a first example of an array of bulk superconductors.
Figure 11:
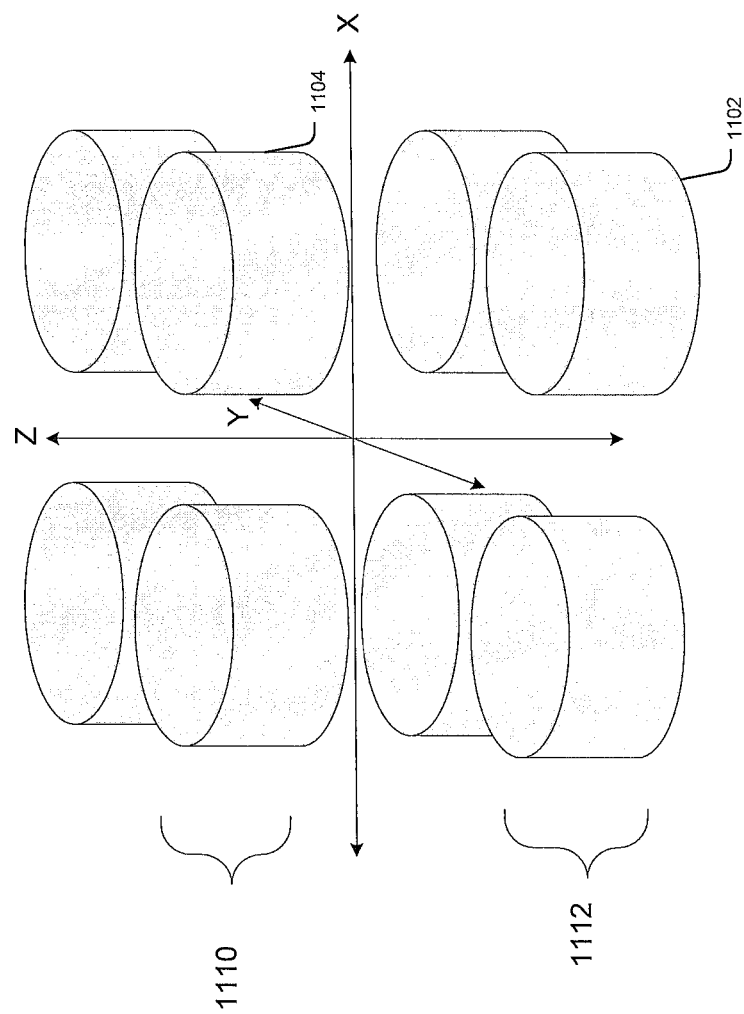
FIG. 11 is a diagram that illustrates a second example of an array of bulk superconductors.

Referring to FIGS. 10 and 11, illustrative arrangements of bulk superconductor arrays are depicted. For example, FIG. 10 depicts a toroidal configuration of an array and FIG. 11 depicts a linear configuration of an array. For ease of illustration, additional components have been omitted, such as heating elements, one or more chambers, etc. The arrangement of the arrays, described with reference to FIGS. 10 and 11, enable a magnetization direction of individual bulk superconductors 136 to be oriented in such a way that the net force of the array is zero. Accordingly, a resulting field of the array including bulk superconductors (or a SMES system including the array) can be confined locally and not interfere with an environment (or equipment) proximate to the SMES system, such as the SMES system 160 of FIG. 1. Therefore, the array of bulk superconductors (or a SMES system including the array) may be constructed without a shielding structure.

Referring to FIG. 10, a first illustrative arrangement of bulk superconductors in an array 1000 is depicted. The array 1000 includes a plurality of bulk superconductors 1002. At least one of the bulk superconductors 1002 may include or correspond to the bulk superconductor 136 of FIG. 1.

The array 1000 has a toroidal configuration in which the arrangement (e.g., geometry) of the array 1000 includes an upper layer 1004 and a lower layer 1006 each including a plurality of bulk superconductors 1002. Although the array 1000 is described as having two layers, in other implementations, the array 1000 may include a single layer or more than two layers. Each of the upper layer 1004 and the lower layer 1006 includes an inner ring and an outer ring. For example, the upper layer 1004 includes an inner ring 1010 and an outer ring 1012. Although the array 1000 is described as having two rings per layer, in other implementations, the array 1000 may include a single ring per layer or more than two rings per layer.

The bulk superconductors of the array 1000 are magnetized in the same azimuthal direction around the rings. By magnetizing the bulk superconductors of the array 1000 in the same direction, an external magnetic field from energy (e.g., magnetic energy) stored at the bulk superconductors is reduced as compared to a similar array in which the bulk superconductors are not all magnetized in the same azimuthal direction. Each of the individual bulk superconductors 1002 of the array 1000 may be located in its own chamber (e.g., the chamber 132). Alternatively, one or more bulk superconductors may be located in a common chamber (e.g., a common cryogenic chamber). In a particular implementation, all of the bulk superconductors of the array 1000 are included in the same chamber. In another implementation, the bulk superconductors of the upper layer 1004 (e.g., a first layer) are included in a first chamber (e.g., a first cryogenic chamber) and the bulk superconductors of the lower layer 1006 (e.g., a second layer) are included in a second chamber (e.g., a second cryogenic chamber). In another implementation, the bulk superconductors of the inner ring 1010 are included in a first chamber and the bulk superconductors of the outer ring 1012 are included in a second chamber.

Referring to FIG. 11, a second illustrative arrangement of bulk superconductors in an array 1100 is depicted. The array 1100 includes a representative bulk superconductors, such as a first bulk superconductor 1102 and a second bulk superconductor 1104. The bulk superconductors 1102, 1104 may include or correspond to the bulk superconductor 136 of FIG. 1.

The array 1100 has a linear configuration in which the arrangement (e.g., geometry) of the array 1100 includes multiple layers, such as an upper layer 1110 and a lower layer 1112. Although the array 1100 is described as having two layers, in other implementations, the array 1100 may include a single layer or more than two layers. Each layer includes multiple rows (with respect to an x-axis) and multiple rows (with respect to a y-axis). Although each layer of the array 1100 is described as having multiple rows (e.g., two rows) and multiple columns (e.g., two columns), in other implementations, each layer of the array 1100 may include a single row or more than two rows. Additionally, or alternatively, each layer of the array 1100 may include a single column or more than two columns.

In some implementations, the bulk superconductors of the array 1100 are magnetized in the same direction. In other implementations, pairs of bulk superconductors have opposite magnetization. To illustrate, the first bulk superconductor 1102 and the second bulk superconductor 1104 may be configured as a pair of bulk superconductors having a stacked configuration. By magnetizing the bulk superconductors such that the pair of bulk superconductors have opposite magnetization, an external magnetic field of the array 1100 may be reduced as compared to a similar array in which the bulk superconductors are all magnetized in the same direction. Additionally, by magnetizing the bulk superconductors such that the pair of bulk superconductors have opposite magnetization, a mechanical force need to keep array 1100 stationary (i.e., to keep the array 1100 from moving) may be reduced as compared to a similar array in which the bulk superconductors are all magnetized in the same direction.

Figure 12:
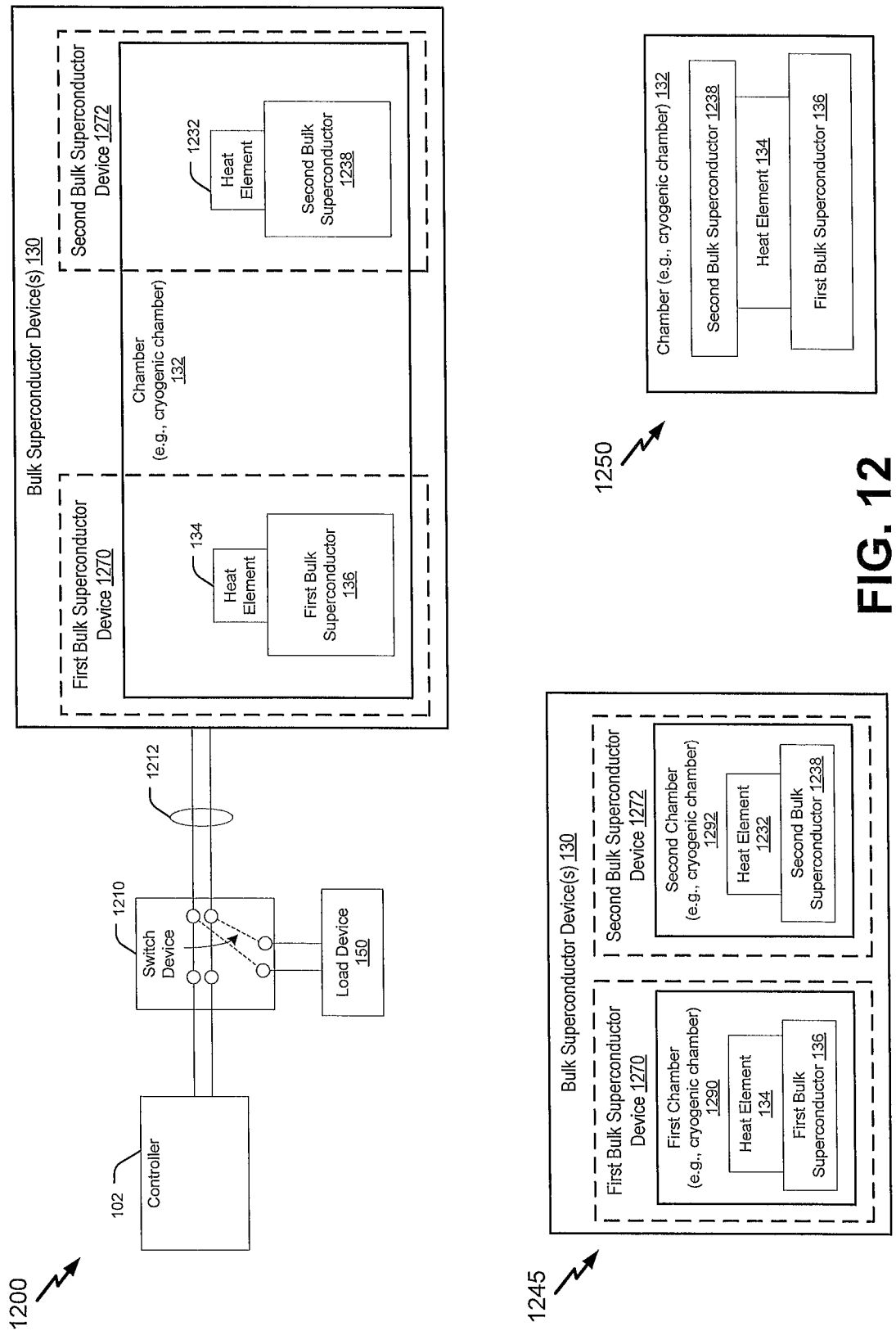
FIG. 12 is a diagram that illustrates an example of a system including a bulk superconductor device.

Referring to FIG. 12, an illustrative example of a system including a bulk superconductor device is depicted and designated 1200. The system 1200 includes the controller 102, the one or more bulk superconductor devices 130, the load device 150, and a switch device 1210 (e.g., a charge/discharge switch device). The one or more bulk superconductor devices 130 include a first bulk superconductor device 1270 and a second bulk superconductor device 1272. Although the one or more bulk superconductor devices 130 are described as including two bulk superconductor devices, in other implementations, the one or more bulk superconductor devices 130 may include a single bulk superconductor device or more than two bulk superconductor devices.

The one or more bulk superconductor devices 130 include the chamber 132 (e.g., a cryogenic chamber). A first bulk superconductor 136 and a second bulk superconductor 1238 are disposed within the chamber 132 (e.g., within a region defined by the chamber 132). For example, the region may be defined by one or more walls of the chamber 132. The first bulk superconductor 136 is coupled to the heat element 134 and the second bulk superconductor 1238 is coupled to a heat element 1232. In some implementations, the first bulk superconductor 136 and the second bulk superconductor 1238 are a pair of bulk superconductors, such as a pair of bulk superconductors having a stacked configuration as described with reference to FIG. 11. The first bulk superconductor device 1270 includes the chamber 132, the heat element 134, and the first bulk superconductor 136. The second bulk superconductor device 1272 includes the chamber 132, the heat element 1232, and the second bulk superconductor 1238. In some implementations, the one or more bulk superconductor devices 130 include a plurality of bulk superconductors. In a particular implementation, the plurality of bulk superconductors is arranged in a toroidal configuration.

Although the first bulk superconductor 136 and the second bulk superconductor 1238 are described as being in the same chamber 132, in an alternative implementation depicted at 1245, each of the first bulk superconductor 136 and the second bulk superconductor 1238 is included in its own chamber. For example, the bulk superconductor devices 130 may include a first chamber 1290 (e.g., a first cryogenic chamber) and a second chamber 1292 (e.g., a second cryogenic chamber). To illustrate, the first bulk superconductor 136 (and the heat element 134) is disposed within the first chamber 1290, and the second bulk superconductor 1238 (and the heat element 1232) is disposed within the second chamber 1292.

Although each of the bulk superconductors 136, 1238 are described as being coupled to a single corresponding heat element, in other implementations, the first bulk superconductor 136 and the second bulk superconductor 1238 may be coupled to multiple heat elements. Additionally, or alternatively, although each of the bulk superconductors 136, 1238 are described as being coupled to a different corresponding heat element, in other implementations, the first bulk superconductor 136 and the second bulk superconductor 1238 are coupled to the same heating element. For example, referring to an illustrative example at 1250, the first bulk superconductor 136 and the second bulk superconductor have a stacked configuration. In the stacked configuration, the heat element 134 is interposed between the bulk superconductors 136, 1238. In other implementations, when the first bulk superconductor 136 and the second bulk superconductor may have a stacked configuration, the first bulk superconductor 136 and the second bulk superconductor may be interposed between two heat elements.

The switch device 1210 is configured to selectively couple power lines 1212 of the one or more bulk superconductor devices 130 to the controller 102 or to the load device 150. For example, in a first configuration (e.g., a first switch position), the switch device 1210 is configured to couple the controller 102 to the one or more bulk superconductor devices 130 to store energy at the bulk superconductors 136, 1238. To illustrate, in the first configuration, the controller 102 provides the power control signal 142 via the power lines 1212 (and via the switch device 1210) to the one or more bulk superconductor devices 130. In a second configuration (e.g., a second switch position), the switch device 1210 is configured to couple the one or more bulk superconductor devices 130 to the load device 150 to enable discharge of stored energy at the bulk superconductors 136, 1238 to the load device 150. To illustrate, in the second configuration, the one or more bulk superconductor devices 130 provide the output signal 144 via the power lines 1212 (and via the switch device 1210) to the load device 150. In a particular implementation, an output of a plurality of bulk superconductors (of the one or more bulk superconductor devices 130) is coupled to the load device 150, such as a laser.

Referring to FIGS. 13A-13D, illustrative examples of different configurations of a system 1302 including multiple bulk superconductor devices are depicted. The configurations described with reference to FIGS. 13A-13D may include or correspond to the configurations 212 of FIG. 2. The system 1302 includes the controller 102, the load device 150, the first bulk superconductor device 1270, and the second bulk superconductor device 1272. The system 1302 further includes a plurality of bulk superconductors (e.g., a first bulk superconductor included in the first bulk superconductor device 1270 and a second bulk superconductor included in the second bulk superconductor device 1272) and multiple switch devices, such as the switch device 1210 (e.g., a charge/discharge switch device) and a plurality of switch devices 1252-1264 (e.g., configuration/isolation switch devices). The plurality of switch device 1352-1364 are configurable to enable different configurations of the first bulk superconductor device 1270 (e.g., a first coil of the first bulk superconductor device 1270) and the second bulk superconductor device 1272 (e.g., a second coil of the second bulk superconductor device 1272), as descried further herein. Although FIGS. 13A-13D depict two bulk superconductor devices and four switch devices included in the plurality of switch device 1352-1364, this is for illustration purposes only and additional bulk superconductor devices and additional switches may be added to the system 1302. Additionally, in some implementations, the plurality of bulk superconductors (e.g., a first bulk superconductor included in the first bulk superconductor device 1270 and a second bulk superconductor included in the second bulk superconductor device 1272) and the plurality of switch devices 1352-1364 are included in an aircraft or a spacecraft, as described further with reference to FIGS. 15 and 16.

Referring to FIG. 13A, a first example of the system 1302 is depicted and generally designated 1300. In the first example 1300, the plurality of switch devices 1352-1364 (e.g., the configuration/isolation switch devices) are in a first configuration in which the first bulk superconductor device 1270 (e.g., a first coil of the first bulk superconductor device 1270) and the second bulk superconductor device 1272 (e.g., a second coil of the second bulk superconductor device 1272) are coupled in parallel.

Referring to FIG. 13B, a second example of the system 1302 is depicted and generally designated 1380. In the second example 1380, the plurality of switch devices 1352-1364 (e.g., the configuration/isolation switch devices) are in a second configuration in which the first bulk superconductor device 1270 (e.g., the first coil of the first bulk superconductor device 1270) is isolated from the rest of the system 1302. To illustrate, as compared to the first example 1300, the switch device 1352 is in an open position such that the first bulk superconductor device 1270 is electrically isolated from power lines 1212, the controller 102, the load device 150, and the second bulk superconductor device 1272. As illustrative, non-limiting examples, the second configuration of the second example 1380 may be used to test the second bulk superconductor device 1272 or to isolate the first bulk superconductor device 1270 from the system 1302 if the first bulk superconductor device 1270 is determined to be defective (e.g., faulty or damaged).

Referring to FIG. 13C, a third example of the system 1302 is depicted and generally designated 1385. In the third example 1385, the plurality of switch devices 1352-1364 are in a third configuration in which the second bulk superconductor device 1272 (e.g., the second coil of the second bulk superconductor device 1272) is isolated from the rest of the system 1302. To illustrate, as compared to the first example 1300, each of the switch devices 1362, 1364 is in an open position such that the second bulk superconductor device 1272 is electrically isolated from power lines 1212, the controller 102, the load device 150, and the first bulk superconductor device 1270.

Referring to FIG. 13D, a fourth example of the system 1302 is depicted and generally designated 1390. In the fourth example 1390, the plurality of switch devices 1352-1364 are in a fourth configuration in which the first bulk superconductor device 1270 (e.g., the first coil of the first bulk superconductor device 1270) and the second bulk superconductor device 1272 (e.g., the second coil of the second bulk superconductor device 1272) are coupled in series. To illustrate, as compared to the first example 1300, the switch device 1360 is in a different position, the switch device 1362 is open, and the switch device is configured to couple the first bulk superconductor device 1270 (e.g., the first coil of the first bulk superconductor device 1270) and the second bulk superconductor device 1272 (e.g., the second coil of the second bulk superconductor device 1272).

In a particular implementation, the system 1302 further includes a third bulk superconductor device and a fourth bulk superconductor device. The third bulk superconductor device and the fourth bulk superconductor device may be coupled in series in a manner similar to the first bulk superconductor device 1270 and the second bulk superconductor device 1272 as described with reference to FIG. 13D. To illustrate, a third coil of the third bulk superconductor device is coupled in series with a fourth coil of the fourth bulk superconductor device. The third bulk superconductor device and the fourth bulk superconductor device (which are coupled in series) may be coupled in parallel with the first bulk superconductor device 1270 and the second bulk superconductor device 1272 (which are coupled in series as depicted in FIG. 13D). To illustrate, the first coil and the second coil (coupled in series) are coupled in parallel with the third coil and the fourth coil (coupled in series).

Figure 14:
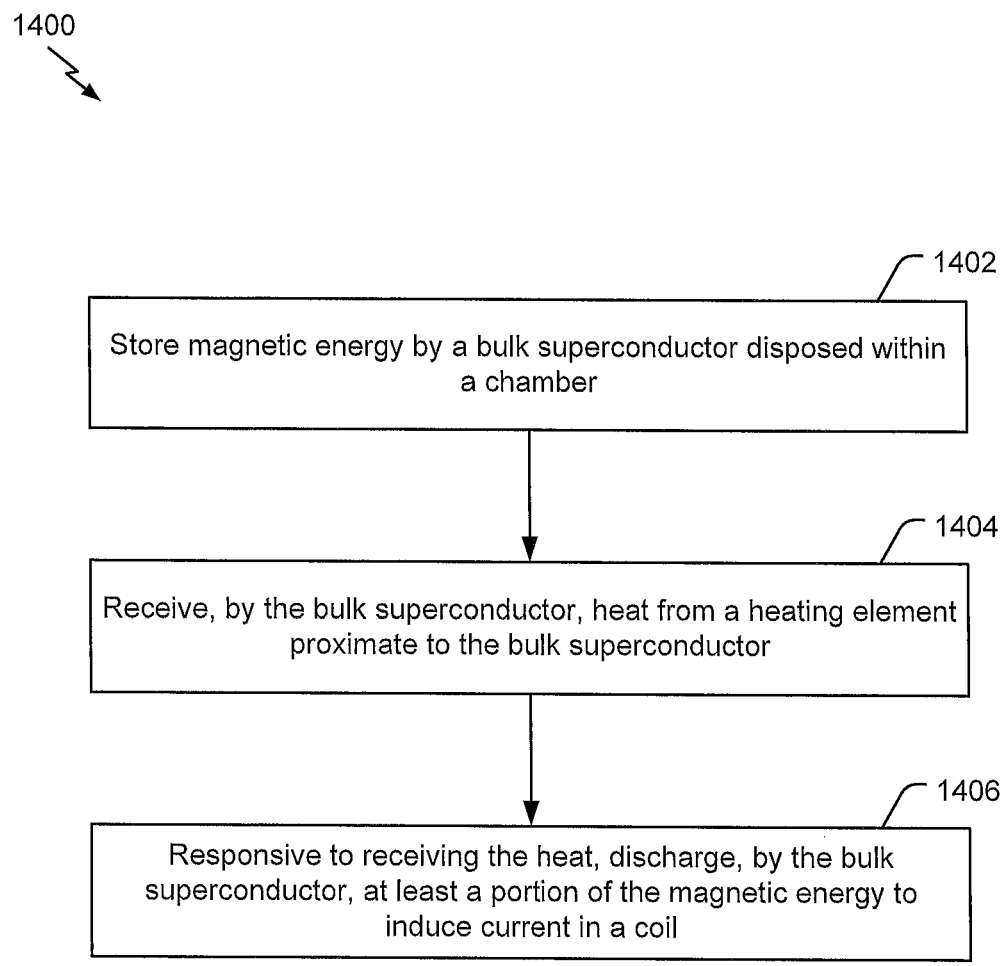
FIG. 14 is a flow chart of an example of a method of operation of a bulk superconductor device.

FIG. 14 illustrates a method 1400 of operating a bulk superconductor (e.g., a bulk superconductor device). The method 1400 may be performed by a bulk superconductor (e.g., a bulk superconductor device), such as the bulk superconductor 136, the one or more bulk superconductor devices 130, the bulk superconductor 1002, the first bulk superconductor 1102, the second bulk superconductor 1104, the second bulk superconductor 1238, the first bulk superconductor device 1270, the second bulk superconductor device 1272, or a combination thereof.

The method 1400 includes storing magnetic energy by the bulk superconductor disposed within a chamber, at 1402. The chamber may include or correspond to the chamber 132, the first chamber 1290, or the second chamber 1292.

The method 1400 also includes receiving, by the bulk superconductor, heat from a heating element proximate to the bulk superconductor, at 1404. The heating element may include or correspond to the heat element 134, the heat element 490, or the heat element 1232.

The method 1400 further includes, responsive to receiving the heat, discharging, by the bulk superconductor, at least a portion of the magnetic energy to induce current in a coil, at 1406. The coil may include or correspond to the coil 340, the first coil 740, or the second coil 770. In a particular implementation, when the bulk superconductor receives the heat, a strength of a magnetic field stored by the bulk superconductor corresponds to a portion of a maximum magnetic field strength that the bulk superconductor can store while maintaining superconductivity at the particular temperature.

In some implementations, the method 1400 includes cooling the bulk superconductor to a particular temperature. The bulk superconductor may be cooled by the cooling element 390 (e.g., a cryocooler cooler), as an illustrative, non-limiting example.

In some implementations, the method 1400 includes generating, by an electrically conductive coil, a magnetic field responsive to current through the electrically conductive coil. The bulk superconductor is charged to store the magnetic energy responsive to the magnetic field. The electrically conductive coil may include or correspond to the coil 340, the first coil 740, or the second coil 770.

Thus, the method 1400 describes operation of a bulk superconductor included in a bulk superconductor device, such as the bulk superconductor device 130. The bulk superconductor stores energy and dissipates the stored energy responsive to heat provided by the heat element. Dissipation of the stored energy generates a pulse (e.g., voltage in a coil) for use in pulsed-power applications. The bulk superconductor is able to be utilized in a superconductor magnetic energy storage (SMES) system to provide a high specific-power energy source suitable for use in pulsed-power applications.

Figure 15:
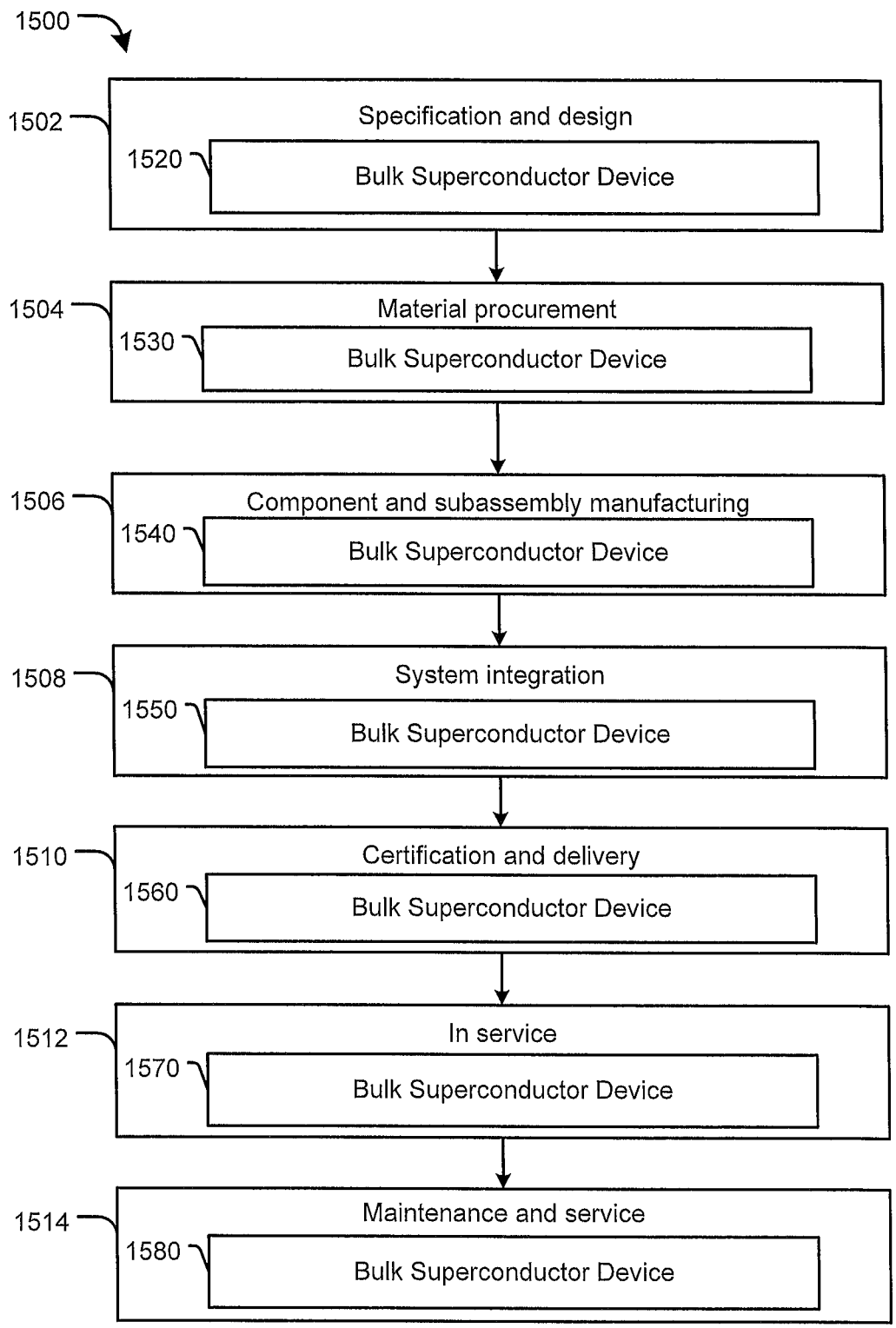
FIG. 15 is a flow chart illustrative of a life cycle of an aircraft that includes the bulk superconductor device of FIG. 1.

Referring to FIG. 15, a flowchart illustrative of a life cycle of an aircraft including a bulk superconductor device is illustrated. During pre-production, the exemplary method 1500 includes, at 1502, specification and design of an aircraft. During specification and design of the aircraft, the method 1500 may include, at 1520, specification and design of a bulk superconductor device. The bulk superconductor device (e.g., the bulk superconductor) corresponds to the one or more bulk superconductor devices 130 (e.g., the bulk superconductor 136) as described with reference to FIG. 1, another bulk superconductor device described with reference to FIGS. 3-12 and 13A-13D, or a combination thereof. At 1504, the method 1500 includes material procurement. At 1530, the method 1500 includes procuring materials for the bulk superconductor device.

During production, the method 1500 includes, at 1506, component and subassembly manufacturing and, at 1508, system integration of the platform. The method 1500 may include, at 1540, component and subassembly manufacturing (e.g., producing the bulk superconductor device) and, at 1550, system integration of the bulk superconductor device. For example, the bulk superconductor device may be mounted in the aircraft. At 1510, the method 1500 includes certification and delivery of the aircraft and, at 1512, placing the aircraft in service. Certification and delivery may include, at 1560, certifying the bulk superconductor device. At 1570, the method 1500 includes placing the aircraft in service. While in service by a customer, the aircraft may be scheduled for routine maintenance and service (which may also include modification, reconfiguration, refurbishment, and so on). At 1514, the method 1500 includes performing maintenance and service on the aircraft. At 1580, the method 1500 includes performing maintenance and service of the bulk superconductor device. For example, maintenance and service of a laser or a control system may include replacing one or more components (e.g., a bulk superconductor) of the bulk superconductor device.

Each of the processes of the method 1500 may be performed or carried out by a system integrator, a third party, and/or an operator (e.g., a customer). For the purposes of this description, a system integrator may include without limitation any number of manufacturers and major-system subcontractors; a third party may include without limitation any number of venders, subcontractors, and suppliers; and an operator may be an airline, a leasing company, a military entity, a service organization, and so on.

Figure 16:
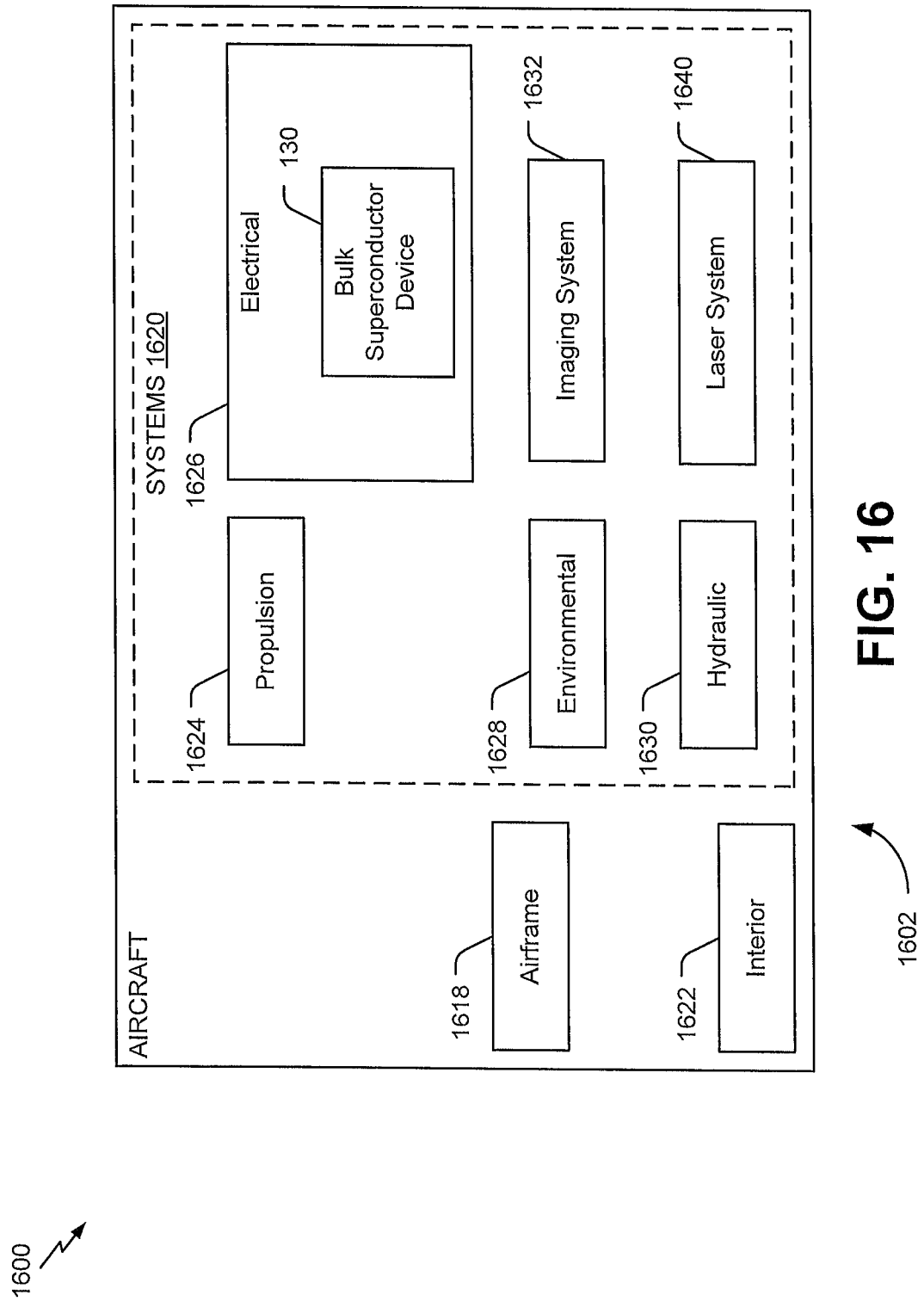
FIG. 16 is a block diagram that illustrates an example of an aircraft including a bulk superconductor device.

Referring to FIG. 16, a block diagram of an illustrative embodiment of an aircraft 1600 (e.g., a manned or unmanned aircraft). Although FIG. 16 is described as the aircraft 1600, this if for illustration only. In other implementations, the aircraft 1600 may include another vehicle or object, such as a spaceship, a satellite, a space station, a land vehicle (e.g., a car, a truck, a tank), a watercraft (e.g., a submarine or a boat), etc. The aircraft 1600 includes an airframe 1618, an interior 1622, and a plurality of systems 1620. The systems 1620 may include one or more of a propulsion system 1624, an electrical system 1626, a hydraulic system 1630, an environmental system 1628, an imaging system 1632, and a laser system 1640. Alternatively, the laser system 1640 may be part of the electrical system 1626. Any number of other systems may be included in the aircraft 1600.

The electrical system 1626 includes the bulk superconductor device 130. In some implementations, the bulk superconductor device 130 is coupled to the laser system 1640. For example, an output of the bulk superconductor device 130 is coupled to the laser system 1640. Although the bulk superconductor device 130 is described as being included in the electrical system 1626, in other implementations the bulk superconductor device is included in the laser system 1640. In other implementations, the bulk superconductor device is coupled to a load device distinct from the laser system 1640.

Apparatus and methods embodied herein may be employed during any one or more of the stages of the method 1500. For example, components or subassemblies corresponding to the production process 1606 may be fabricated or manufactured in a manner similar to components or subassemblies produced while the aircraft 1600 is in service, for example at 1612. Also, one or more of apparatus embodiments, method embodiments, or a combination thereof may be utilized while the aircraft 1600 is in service, at 1612 for example and without limitation, to maintenance and service, at 1614.

Figure 17:
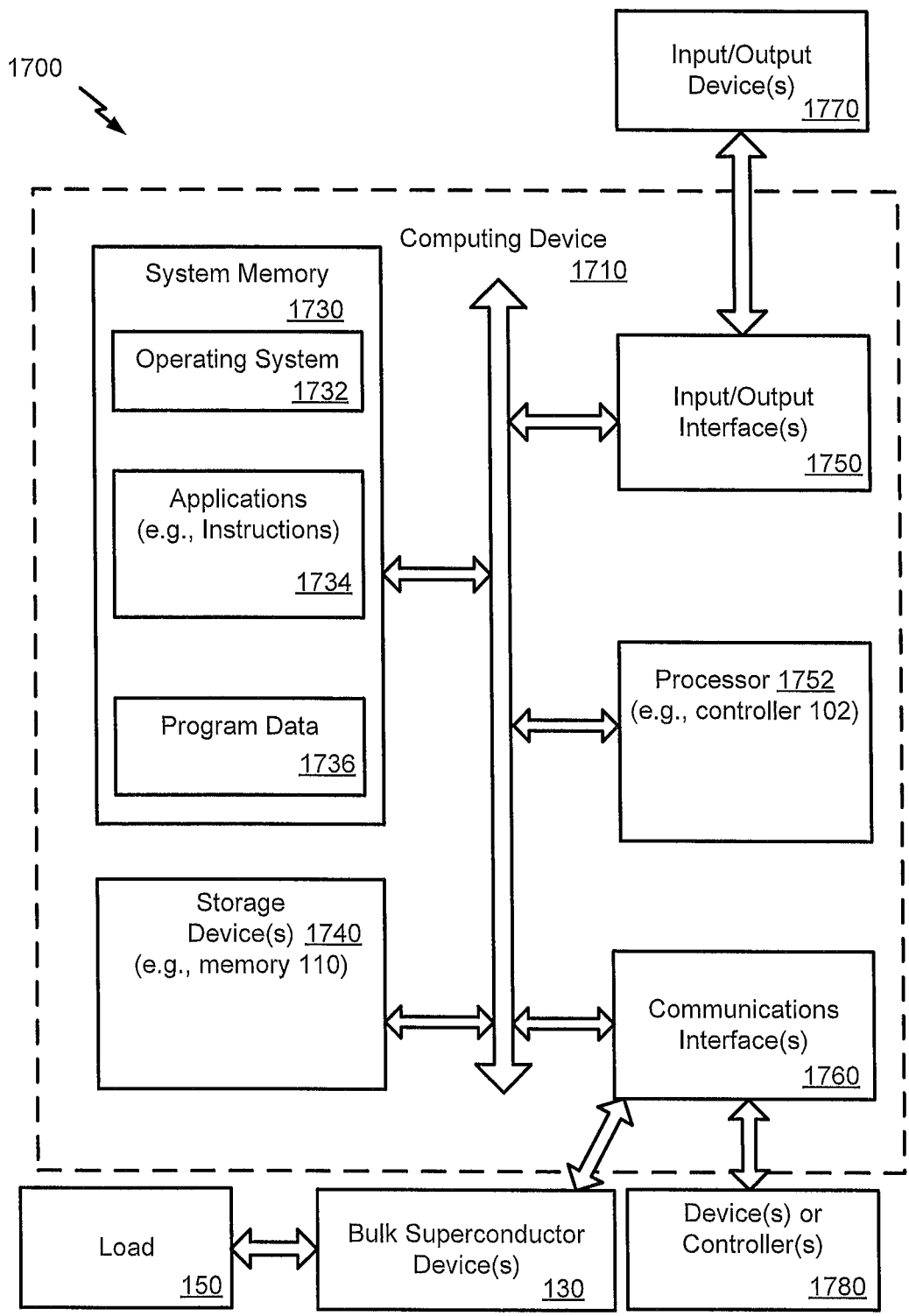
FIG. 17 is a block diagram of a particular example of a computing environment configured to control operation of a bulk superconductor device according to the present disclosure.

FIG. 17 is an illustration of a block diagram of a computing environment 1700 including a device 1710 (e.g., a general-purpose computing device) configured to support embodiments of computer-implemented methods and computer-executable program instructions (or code) according to the present disclosure. For example, the computing device 1710, or portions thereof, may execute instructions to perform or initiate the functions of the system 100 of FIG. 1, the system 1200 of FIG. 12, or the system 1302 of FIGS. 13A-13D. For example, the computing device 1710, or portions thereof, may execute instructions to perform the functions of the controller 102 (e.g., the operation manager 120, the heat controller 122, the test logic 226, or combination thereof). The computing device 1710, or portions thereof, may further execute instructions according to any of the methods described herein, or to enable any of the methods described herein, such as the method 1400 of FIG. 14.

The computing device 1710 includes a processor 1752. The processor 1752 may include or correspond to the controller 102 of FIG. 1. The processor 1752 may communicate with the system memory 1730, one or more storage devices 1740, one or more input/output interfaces 1750, one or more communications interfaces 1760, or a combination thereof.

The system memory 1730 may include volatile memory devices (e.g., random access memory (RAM) devices), nonvolatile memory devices (e.g., read-only memory (ROM) devices, programmable read-only memory, and flash memory), or both. The system memory 1730 may include an operating system 1732, which may include a basic/input output system for booting the computing device 1710 as well as a full operating system to enable the computing device 1710 to interact with users, other programs, and other devices. The system memory 1730 may include one or more applications 1734 which may be executable by the processor 1752. For example, the one or more applications 1734 may include instructions executable by the processor 1752 to operate a system including a bulk superconductor device, such as the bulk superconductor device 130. Additionally, or alternatively, the one or more applications 1734 may include instructions executable by the processor 1752 to operate a load device, such as the load device 150.

The processor 1752 may also communicate with one or more storage devices 1740. For example, the one or more storage devices 1740 may include nonvolatile storage devices, such as magnetic disks, optical disks, or flash memory devices. The storage devices 1740 may include both removable and non-removable memory devices. The storage devices 1740 may be configured to store an operating system, images of operating systems, applications, and program data. The storage devices 1740 may also store other data, such as the configurations 212, the timing parameters 114, or the test parameters 116. In a particular embodiment, the system memory 1730, the storage devices 1740, or both, include tangible computer-readable media. The storage device 1740 or the system memory 1730 may include or correspond to the memory 110 of FIG. 1.

The processor 1752 may communicate with one or more input/output interfaces 1750 that enable the computing device 1710 to communicate with one or more input/output devices 1770 to facilitate user interaction. The input/output interfaces 1750 may include serial interfaces (e.g., universal serial bus (USB) interfaces or Institute of Electrical and Electronics Engineers (IEEE) 1394 interfaces), parallel interfaces, display adapters, audio adapters, and other interfaces. The input/output devices 1770 may include keyboards, pointing devices, displays, speakers, microphones, touch screens, and other devices. The processor 1752 may detect interaction events based on user input received via the input/output interfaces 1750. Additionally, the processor 1752 may send a display to a display device via the input/output interfaces 1750.

The processor 1752 may communicate with (or send signals to) the bulk superconductor device 130, one or more devices 1780, or a combination thereof, via the one or more communications interfaces 1760. For example, the processor 1752 may communicate (or initiate) one or more control signals, test signals, powers signals, heat control signals, switching signals, or a combination thereof, to the bulk superconductor device 130. The one or more communications interfaces 1760 may include wired Ethernet interfaces, IEEE 802 wireless interfaces, other wireless communication interfaces, or other network interfaces. The one or more devices 1780 may include host computers, servers, workstations, and other computing devices. The bulk superconductor device 130 is coupled to the load device 150.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

The flowcharts, modules, or components shown in the attached figures may represent the hardware that operates based on software instructions and hardware logic, the software that directs hardware to perform operations, or a combination thereof. Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A bulk superconductor device comprising:
   a chamber;
   a bulk superconductor disposed within the chamber, the bulk superconductor having a first surface, a second surface opposite the first surface, at least one side surface that extends from the first surface to the second surface, and a cavity formed in the bulk superconductor that extends from a center of the first surface toward the second surface;
   at least one coil that surrounds the at least one side surface; and
   a heating element coupled to the bulk superconductor, wherein a first portion of the heating element is positioned in the cavity, wherein a second portion of the heating element is coupled to the first surface, and wherein the second portion surrounds an opening of the cavity.

2. The bulk superconductor device of claim 1, wherein activation of the heating element when the bulk superconductor is magnetized causes magnetic flux of the bulk superconductor to cascade towards the at least one side surface.

3. The bulk superconductor device of claim 1, wherein the cavity extends through the bulk superconductor to the second surface.

4. The bulk superconductor device of claim 3, wherein the first surface and the second surface have square geometries.

5. The bulk superconductor device of claim 1, further comprising a reinforcement structure coupled to the bulk superconductor.

6. The bulk superconductor device of claim 1, further comprising:
  a second bulk superconductor disposed within the chamber; and
  a second heating element attached to the second bulk superconductor.

7. The bulk superconductor device of claim 1, further comprising a second heating element proximate to the second surface of the bulk superconductor.

8. The bulk superconductor device of claim 1, wherein the chamber contains nitrogen as a liquid cryogen and a block of solid nitrogen as a solid cryogen.

9. The bulk superconductor device of claim 1, further comprising a cooling element configured to conductively cool the bulk superconductor.

10. The bulk superconductor device of claim 1, further comprising a second bulk superconductor disposed within the chamber.

11. A method of operating a bulk superconductor device, the method comprising:
  storing magnetic energy by a bulk superconductor disposed within a chamber, the bulk superconductor having a first surface, a second surface opposite the first surface, at least one side surface that extends from the first surface to the second surface, and a cavity formed in the bulk superconductor that extends from a center of the first surface toward the second surface;
  receiving, by the bulk superconductor, heat from a heating element, wherein a first portion of the heating element is positioned in the cavity, wherein a second portion of the heating element is coupled to the first surface, and wherein the second portion surrounds an opening of the cavity; and
  responsive to receiving the heat, discharging, by the bulk superconductor, at least a portion of the magnetic energy to induce current in a coil that surrounds the at least one side surface.

12. The method of claim 11, further comprising cooling the bulk superconductor to a particular temperature.

13. A bulk superconductor system comprising:
  a plurality of bulk superconductors including a first bulk superconductor and a second bulk superconductor, the first bulk superconductor having a first surface, second surface opposite the first surface, at least one side surface that extends from the first surface to the second surface, and a cavity formed in the bulk superconductor that extends from a center of the first surface toward the second surface;
  a heating element coupled to the first bulk superconductor, wherein a first portion of the heating element is positioned in the cavity, wherein a second portion of the heating element is coupled to the first surface, and wherein the second portion surrounds an opening of the cavity;
  at least one coil that surrounds the at least one side surface; and
  a plurality of switch devices electrically coupled to the plurality of bulk superconductors, wherein, in a first configuration of the plurality of switch devices, the first bulk superconductor and the second bulk superconductor are coupled in series, and wherein, in a second configuration of the plurality of switch devices, the first bulk superconductor and the second bulk superconductor are coupled in parallel.

14. The bulk superconductor system of claim 13, further comprising a chamber, the first bulk superconductor and the second bulk superconductor disposed within the chamber.

15. The bulk superconductor system of claim 13, further comprising:
  a first chamber, the first bulk superconductor disposed within the first chamber; and
  a second chamber, the second bulk superconductor disposed within the second chamber.

16. The bulk superconductor system of claim 13, wherein the plurality of bulk superconductors is arranged in a toroidal configuration.

17. The bulk superconductor system of claim 13, wherein the first bulk superconductor and the second bulk superconductor are in a stacked configuration.

18. The bulk superconductor system of claim 13, further comprising a load device coupled to an output of the plurality of bulk superconductors.

19. The bulk superconductor system of claim 18, wherein the load device comprises a laser.

20. The bulk superconductor system of claim 13, wherein the plurality of bulk superconductors and the plurality of switch devices are included in an aircraft or a spacecraft.

* * * * *